US012143444B1

(12) United States Patent
Mendell et al.

(10) Patent No.: US 12,143,444 B1
(45) Date of Patent: Nov. 12, 2024

(54) SYSTEMS AND METHODS FOR CREATING SYNCHRONIZED DATA STRUCTURES FOR SYNCHRONIZED GROUPS

(71) Applicant: DK Crown Holdings Inc., Boston, MA (US)

(72) Inventors: Jordan Mendell, Boca Raton, FL (US); Christopher Haralampoudis, Venice, CA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/390,969

(22) Filed: Dec. 20, 2023

(51) Int. Cl.
*H04L 67/1095* (2022.01)
*H04L 9/40* (2022.01)

(52) U.S. Cl.
CPC ........ *H04L 67/1095* (2013.01); *H04L 63/101* (2013.01)

(58) Field of Classification Search
CPC .......................... H04L 67/1095; H04L 63/101
See application file for complete search history.

(56) References Cited

U.S. PATENT DOCUMENTS

| 9,039,507 | B2 * | 5/2015 | Allen | G07F 17/32 463/16 |
| 2013/0005471 | A1 * | 1/2013 | Chung | A63F 13/86 463/42 |
| 2013/0198304 | A1 * | 8/2013 | Jung | H04L 12/1818 709/206 |
| 2014/0148230 | A1 * | 5/2014 | Guase | G07F 17/3274 463/20 |
| 2016/0001184 | A1 * | 1/2016 | Sepulveda | A63F 13/60 463/31 |
| 2018/0218571 | A1 * | 8/2018 | Kelly | G07F 17/3293 |
| 2019/0122500 | A1 * | 4/2019 | Joao | G06T 19/006 |
| 2020/0306643 | A1 * | 10/2020 | Borovikov | A63F 13/67 |
| 2021/0158653 | A1 * | 5/2021 | Hartstein | G07F 17/3288 |
| 2021/0264735 | A1 * | 8/2021 | Joao | G07F 17/3241 |
| 2021/0354033 | A1 * | 11/2021 | Ono | A63F 13/533 |

(Continued)

FOREIGN PATENT DOCUMENTS

| JP | 2020121101 A | * | 8/2020 | ........... A63F 13/355 |
| JP | 2021104328 A | * | 7/2021 | |

(Continued)

*Primary Examiner* — Shean Tokuta
(74) *Attorney, Agent, or Firm* — Foley & Lardner LLP

(57) ABSTRACT

Described herein are systems and methods for creating synchronized data structures for synchronized groups. The system can receive a request from a first client device to create a contest for a synchronized group. The system can generate the contest within the synchronized group. The contest may define criteria for participation, including at least the interaction type. The system can receive an indication that a second player profile identified in the synchronized group performed an interaction having the interaction type. The system can update a data structure corresponding to a feed of the synchronized group to include data corresponding to the interaction and the second player profile. The system can receive a second request from the first client device to view the feed of the synchronized group. The system can provide the feed of the synchronized group, including a content item generated based on the data, to the first client device.

18 Claims, 11 Drawing Sheets

(56) References Cited

U.S. PATENT DOCUMENTS

| | | | |
|---|---|---|---|
| 2022/0261790 A1* | 8/2022 | Choi | G06Q 20/401 |
| 2022/0382825 A1* | 12/2022 | Koriaka | G06F 16/9577 |
| 2022/0383294 A1* | 12/2022 | Medeiros | G06Q 20/02 |
| 2023/0011617 A1* | 1/2023 | Bassilli | G06Q 20/401 |

FOREIGN PATENT DOCUMENTS

| | | | | |
|---|---|---|---|---|
| JP | 2021115409 A | * | 8/2021 | |
| JP | 7036970 B1 | * | 3/2022 | |
| JP | 2022109521 A | * | 7/2022 | A63F 13/48 |
| JP | 7174113 B1 | * | 11/2022 | |
| JP | 7245213 B2 | * | 3/2023 | |
| JP | 7265061 B1 | * | 4/2023 | |
| KR | 20130089822 A | * | 8/2013 | |
| KR | 2144529 B1 | * | 8/2020 | G06Q 20/02 |
| KR | 102144529 B1 | * | 8/2020 | |
| KR | 20230024632 A | * | 2/2023 | |
| WO | WO-2020191090 A1 | * | 9/2020 | H04L 65/4015 |

\* cited by examiner

Receipt | 1 of 1 bets placed

BET PLACED
NY Yankees +1.5 | -155
RUN LINE
NY Mets @ NY Yankees (Today HH:MM AM/PM)

Wager Amount: | $5.00
Total Payout: | $8.22

MM DD, YYYY, HH:MM AM/PM DK638259049331027802

BET WITH FRIENDS

My Groups | Share Bet — 246

Your best was shared with your Betting Groups

[NEW] Suggested trending picks ^

BAL Orioles | +105 | TB Ray...
Moneyline | | Money...
BAL Orioles @ PHI Phillies | | MIA M...
25 Jul, 3:40 PM | | 25 Jul,...

Keep Picks in Bet Slip

Done — 248

242 — (top left)
244 — (My Groups)

FIG. 2F

SYSTEMS AND METHODS FOR CREATING SYNCHRONIZED DATA STRUCTURES FOR SYNCHRONIZED GROUPS

BACKGROUND

In online platforms, synchronized information sharing among multiple users is useful to facilitate interactive activities. Information can be shared using different formats or protocols. It is challenging to provide efficient synchronization and management in computing systems with different types of computing devices.

SUMMARY

The systems and methods of this technical solution provide techniques for synchronized information sharing between multiple computing devices to enable the creation of synchronized data structures and monitor and update synchronized groups upon detecting interactive, online activities. Due to the real-time nature of detecting interactions or online actions, it can be challenging to track participant interactions and update synchronized data structures while corresponding to multiple computing devices. The systems and methods of this technical solution address these and other issues by providing synchronized groups, and tracking interactions performed via multiple computing devices to that satisfy criteria for updating synchronized data structures. The synchronized data structures described herein can be used to dynamically update graphical user interfaces corresponding to the synchronized groups.

One aspect of the present disclosure relates to a system for creating synchronized data structures for synchronized groups. The system can include one or more processors coupled to memory. The one or more processors may receive a request from a first client device to create a contest for a synchronized group. The first client device may be associated with a first player profile identified as a host of the synchronized group. The request may correspond to identifying an interaction type to be performed for participation in the contest. The request may correspond to identifying at least one criteria for at least one action for participation in the contest. The one or more processors may generate the contest within the synchronized group. The contest may define criteria for participation, including at least the interaction type. The one or more processors may receive an indication that a second player profile identified in the synchronized group performed an interaction having the interaction type. The one or more processors may update a data structure corresponding to a feed of the synchronized group to include data corresponding to the interaction and the second player profile. The one or more processors may receive a second request from the first client device to view the feed of the synchronized group. The one or more processors may provide the feed of the synchronized group, including a content item generated based on the data, to the first client device. The feed may include an identifier of the contest and the second player profile.

In some implementations, the one or more processors may receive, from a second client device associated with the second player profile, a third request to perform the at least one action. The one or more processors may generate a data record corresponding to the at least one action performed via the second player profile.

In some implementations, the one or more processors may update a data structure storing information for a feed of the synchronized group based on the data record.

In some implementations, the one or more processors may determine that the second player profile includes a permission setting authorizing performance of actions to be included in the synchronized group. The one or more processors may update the data structure corresponding to the feed of the synchronized group responsive to determining that the second player profile includes the permission setting.

In some implementations, the one or more processors may receive a fourth request to revoke the permission setting of the second player profile authorizing performance of actions to be included in the synchronized group.

In some implementations, the one or more processors may determine that the interaction performed via the second player profile satisfies the criteria for the contest. The one or more processors may update the data structure corresponding to the feed of the synchronized group in response to determining that the interaction satisfies the criteria.

In some implementations, the one or more processors may receive an expiration time for the contest. The one or more processors may update the synchronized group with an indication that the contest is expired in response to determining that a current time exceeds the expiration time.

In some implementations, the one or more processors may determine a score for the second player profile based on an outcome corresponding to the interaction. The one or more processors may generate contest results for the contest of the synchronized group based on the score.

In some implementations, the one or more processors may restrict updates to the contest in response to updating the contest based on a threshold number of interactions satisfying the criteria of the contest.

At least one aspect of the present disclosure is directed to a method of creating synchronized data structures for synchronized groups. The method can include receiving a request from a first client device to create a contest for a synchronized group. The first client device may be associated with a first player profile identified as a host of the synchronized group. The request may correspond to identifying an interaction type to be performed for participation in the contest. The request may correspond to identifying at least one criteria for at least one action for participation in the contest. The method can include generating the contest within the synchronized group. The contest may define criteria for participation, including at least the interaction type. The method can include receiving an indication that a second player profile identified in the synchronized group performed an interaction having the interaction type. The method can include updating a data structure corresponding to a feed of the synchronized group to include data corresponding to the interaction and the second player profile. The method can include receiving a second request from the first client device to view the feed of the synchronized group. The method can include providing the feed of the synchronized group, including a content item generated based on the data, to the first client device. The feed may include an identifier of the contest and the second player profile.

The method can include receiving, from a second client device associated with the second player profile, a third request to perform the at least one action. The method can include generating a data record corresponding to the at least one action performed via the second player profile.

The method can include updating a data structure storing information for a feed of the synchronized group based on the data record.

The method can include determining that the second player profile includes a permission setting authorizing performance of actions to be included in the synchronized group. The method can include updating the data structure corresponding to the feed of the synchronized group responsive to determining that the second player profile includes the permission setting.

The method can include receiving a fourth request to revoke the permission setting of the second player profile authorizing performance of actions to be included in the synchronized group.

The method can include determining that the interaction performed via the second player profile satisfies the criteria for the contest. The method can include updating the data structure corresponding to the feed of the synchronized group in response to determining that the interaction satisfies the criteria.

The method can include receiving an expiration time for the contest. The method can include updating the synchronized group with an indication that the contest is expired in response to determining that a current time exceeds the expiration time.

The method can include determining a score for the second player profile based on an outcome corresponding to the interaction. The method can include generating contest results for the contest of the synchronized group based on the score.

The method can include restricting updates to the contest in response to updating the contest based on a threshold number of interactions satisfying the criteria of the contest.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 2A-2H illustrate example user interfaces that can be utilized to create synchronized data structures for synchronized groups, in accordance with one or more implementations;

DETAILED DESCRIPTION

The systems and methods of this technical solution provide techniques for creating and managing synchronized data structures within synchronized groups in a networked environment. The techniques disclosed herein can process requests from a host player profile, identified through a first client device, to create a synchronized data structure within a synchronized group. The synchronized data structure can be generated according to criteria specified via the first client device, which in some implementations can correspond to specific interaction types or other data structure parameters. When an action is performed via a second player profile that is identified as a member of the synchronized group, and the action satisfies the criteria of the synchronized data structure, the system can update the synchronized data structure for the synchronized group based on the performance of the action. The synchronized data structure can be dynamically updated and utilized to generate corresponding graphical user interfaces, which can be accessed by client devices using player profiles identified as members of the synchronized group. Such techniques can enable real-time, synchronized updates to data structures associated with synchronized groups.

The systems and methods described herein leverage cloud computing technology (e.g., a networked gaming environment, a cloud, video gaming devices, etc.) to synchronize interactions across various computing devices, such as laptops, smartphones, personal computers, smart televisions, and gaming consoles. The synchronization described herein can be focused on coordinating contest data and updates to player profiles within the synchronized group. One example of a synchronized data structure can include a contest of the synchronized group. When a player performs an action, the system can verify whether the player is a member of the synchronized group. For example, using an identifier of the player profile, the system can perform a database lookup to confirm the player's membership in the synchronized group. Additionally, when a client device transmits a request to access a feed of the synchronized group, the system can provide a dynamically updated feed of content items generated from the synchronized data structures and/or interactions corresponding to the synchronized group. The content items can include relevant identifiers of the synchronized group, synchronized data structures associated therewith, and any player profiles associated therewith, thereby maintaining an updated record of actions performed within the synchronized group using the synchronized data structures. These and other features of data processing systems that create synchronized data structures for synchronized groups are described in greater detail herein below.

Figure 1:
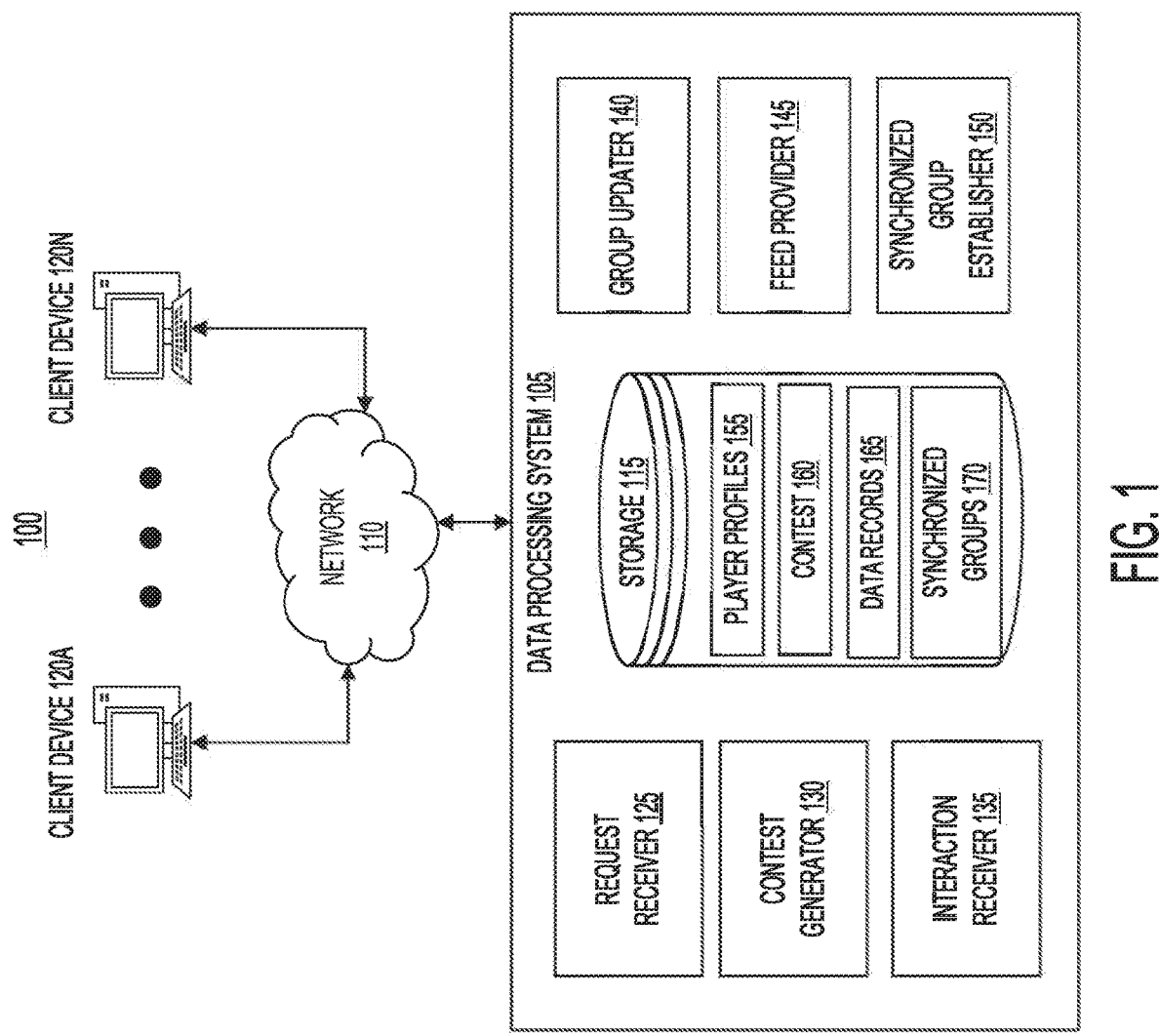
FIG. 1 is a block diagram of an example system for synchronizing data structures using synchronized groups, in accordance with one or more implementations.

Referring now to FIG. 1, illustrated is a block diagram of an example system 100 for creating synchronized data structures for synchronized groups, in accordance with one or more implementations. The system 100 can include at least one data processing system 105, at least one network 110, and one or more client devices 120A-120N (sometimes generally referred to as client device(s) 120). The data processing system 105 can include a request receiver 125, a contest generator 130, an interaction receiver 135, a group updater 140, a feed provider 145, a synchronized group establisher 150, and at least one storage 115. The storage 115 can include one or more player profiles 155, one or more contests 160, one or more data records 165 (sometimes generally referred to as the data record(s) 165), and one or more synchronized groups 170 (sometimes generally referred to as the synchronized group(s) 170 or "betting groups"). Although shown here as internal to the data processing system 105, the storage 115 can be external to the data processing system 105, for example, as a part of a cloud computing system or an external computing device in communication with the devices (e.g., the data processing system 105, the client devices 120, etc.) of the system 100 via the network 110.

Figure 4:
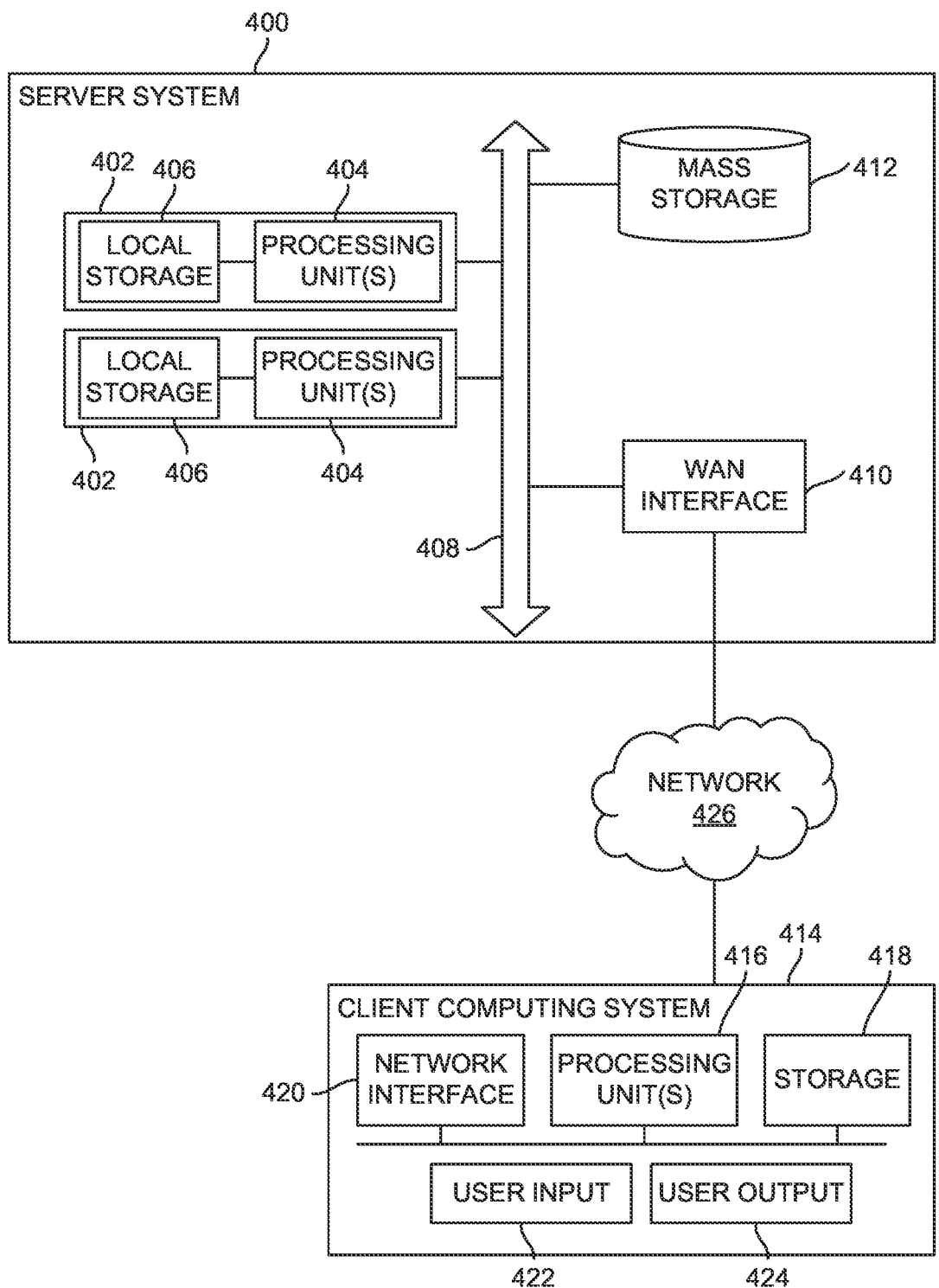
FIG. 4 illustrates a block diagram of a server system and a client computer system in accordance with an illustrative implementation.

Each of the components (e.g., the data processing system 105, the network 110, the client devices 120, the contest generator 130, the interaction receiver 135, the group updater 140, the feed provider 145, the storage 115, etc.) of the system 100 can be implemented using the hardware components or a combination of software with the hardware components of a computing system, such as the server 400 or the client computing system 414 described in connection with FIG. 4, or any other computing system described herein.

The data processing system 105 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all of the components and perform any or all of the functions of a server system 400 described herein in conjunction with FIG. 4.

In some implementations, the data processing system 105 may communicate with the client devices 120, for example, to provide user interfaces (e.g., the user interfaces described in connection with FIGS. 2A-2H, etc.) and to receive user input, via the network 110. In one example, the data processing system 105 can be or can include an application server or webserver, either of which may include software modules allowing various computing devices (e.g., the client devices 120, etc.) to access and/or manipulate data stored by the data processing system 105. For example, the data processing system 105 may comprise a webserver allowing the various computing devices to access data (e.g., via one or more web-based user interfaces, such as those described in connection with FIGS. 2A-2H) that is collected and manipulated by the data processing system 105. In this example, a player accessing the functionality of the data processing system 105 using a corresponding player profile 155 may execute a web browser application and access a website hosted on the webserver in order to access data (e.g., one or more feeds of a synchronized group 170 as described herein, etc.) generated or maintained by the data processing system 105.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for instance with one or more client devices 120. The network 110 may be any form of computer network that can relay information between the data processing system 105, the one or more client devices 120, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive or transmit data within the network 110.

The network 110 may further include any number of hardwired and/or wireless connections. Any or all of the computing devices described herein (e.g., the data processing system 105, the one or more client devices 120, the server system 400, the client computing system 414, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 110. Any or all of the computing devices described herein (e.g., the data processing system 105, the one or more client devices 120, the server system 400, the client computing system 414, etc.) may also communicate wirelessly with the computing devices of the network 110 via a proxy device (e.g., a router, network switch, or gateway).

Each of the client devices 120 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 120 can include one or more computing devices or servers that can perform various operations as described herein. The one or more client devices 120 can include any or all of the components and perform any or all of the functions of the client computing system 414 described herein in conjunction with FIG. 4.

Each client device 120 can be a personal computer, a laptop computer, a television device, a smart phone device, a mobile device, or another type of computing device. Each client device 120 can be implemented using hardware or a combination of software and hardware. Each client device 120 can include a display or display portion. The display can include a display portion of a television, a display portion of a computing device, a GUI, or another type of interactive display (e.g., a touchscreen, a display, etc.) and one or more I/O devices (e.g., a mouse, a keyboard, digital key pad). The display can include one or more portions, for example, to display user interfaces described in connection with FIGS. 2A-2H, which relate to the synchronized groups 170. The display can include a touch screen displaying an application, such as a web browser application or a native application which may be used to access the functionality of the data processing system 105 described herein.

The display may include a border region (e.g., side border, top border, bottom border). The display can include a touch screen display, which can receive interactions from a player. The client device 120 may also receive interactions via any other type of I/O device. The interactions can result in interaction data, which can be stored and transmitted by the processing circuitry of the client device 120. The interaction data can include, for example, interaction coordinates, an interaction type (e.g., drag, click, swipe, scroll, tap, etc.), and an indication of an actionable object (e.g., an interactive user interface element, such as a button, hyperlink, etc.) with which the interaction occurred. The interaction data can identify a user interface element (e.g., including any of the user interface elements described in connection with FIGS. 2A-2H) with which the interaction occurred.

Each client device 120 can include an input device that couples or communicates with the display of each client device 120 to enable a player to interact with or select one or more actionable objects as described herein. The display can enable interaction with one or more visual indications provided through the display of each client device 120, and responsive to an interaction (e.g., select, click-on, touch, hover), the client device 120 can generate an indication identifying a user input and/or selection of a wager, a contest, a live event, a content item in a feed of a synchronized group 280, an indication to establish or join a synchronized group 280, an indication to participate in a contest, or an interaction to "tail" or "fade" a content item, among others.

Each client device 120 can include or be identified by a device identifier, which can be specific to each respective client device 120. The device identifier can include a script, code, label, or marker that identifies a particular client device 120. In some implementations, the device identifier can include a string or plurality of numbers, letters, characters or any combination numbers, letters, and characters. In some embodiments, each client device 120 can have a unique device identifier. Each client device 120 can include a client application, which can be a web browser or a native application that communicates with the data processing system 105 to establish or join a synchronized group 170, create a contest 160, generate one or more data records 165 corresponding to the contest 160 and/or a live event (e.g., a post, a wager, etc.), or other functionality described herein. The client application can be executing on each client device 120, and may be provided to the client device 120 by the data processing system 105. The application can include a web application, a server application, a resource, a desktop, or a file.

The application can include a local application (e.g., local to a client device 120), hosted application, a SaaS application, a virtual application, a mobile application, or other forms of content. In some implementations, the application can include or correspond to applications provided by remote servers or third party servers. In some implementations, the application can access the player profiles 155, the contests 160, the data records 165, or the synchronized groups 170, stored and maintained in the storage 115, and generate one or more interactive user interface elements, such as the interactive user interface elements described in connection with FIGS. 2A-2H, to a player when executed on a client device 120. The interactive user interface elements can include user-selectable hyperlinks, buttons, graphics, videos, images, or other application features. Interactions with such interactive user interface elements (sometimes referred to as "actionable objects") can cause the application executing on the respective client device 120 to generate a signal, which can cause the application to perform further operations corresponding to the actionable object.

In some implementations, one or more client devices 120 can establish one or more communication sessions with the data processing system 105. The one or more communication sessions can each include a channel or connection between the data processing system 105 and the one or more client devices 120. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data, or traffic.

In some implementations, in response to interactions with corresponding user interface elements, the application executing on a client device 120 can transmit information, such as player profile 155 information (e.g., changing player profile 155 parameters, changing login information, etc.), interaction information, creation of a contest 160, selections of wager amounts, selections to establish a synchronized group 170, selections to join, view, or delete a synchronized group 170, selections to place a wager or authorize automatic population of wager information, or other signals to the data processing system 105. The client device 120 can transmit a request to create a contest 160. The request can include, for example, one or more identifiers of player profiles 155 that are invited to participate in the contest 160. In some implementations, the client device 120 can transmit a request to establish a synchronized group 170. The request can include, for example, a request to create or join a synchronized group 170. The request can include, for example, one or more identifiers of player profiles 155 that are invited to join the synchronized group 170. Additional requests may also be transmitted, including requests to generate one or more data records 165. The requests can be hypertext transfer protocol (HTTP or HTTPS) request messages, file transfer protocol messages, email messages, text messages, or any other type of message that can be transmitted via the network 110.

As described herein, a client device 120 can receive one or more interactions with actionable objects presented on the display of the client device. Interactions can be tap interactions, click interactions, or other types of indications that a user is engaged with a particular user interface element. Upon detecting an interaction with a particular user interface element, the client device 120 can execute instructions (e.g., processor-readable code, a script, etc.) that cause the client device 120 to transmit an appropriate signal to the data processing system 105. Additionally, the client devices 120 may receive and display one or more feeds of content items, which may correspond to interactions within a contest 160 and the player profiles 155 of participating players in one or more synchronized groups 170, as described herein.

In some implementations, the application interfaces can generate a notification to join a contest 160 for a synchronized group 170 in response to receiving a request to join the contest 160 from the data processing system 105. The notification can include an actionable object to accept or reject the invitation to join the contest 160. In response to an interaction with the actionable object indicating the player intends to join the contest 160, the application can transmit a message to the data processing system 105 indicating that the player intends to join the contest 160. The message can include an identifier of the player profile 155 that accepted the invitation to join the contest 160. In response to an interaction with the actionable object indicating the player has rejected the invitation, the application can transmit a message to the data processing system 105 indicating that the player does not intend to join the contest 160.

The storage 115 can be a computer-readable memory that can store or maintain any of the information described herein. The storage 115 can store or maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. The storage 115 can be accessed by the components of the data processing system 105, or any other computing device described herein, via the network 110. In some implementations, the storage 115 can be internal to the data processing system 105. In some implementations, the storage 115 can exist external to the data processing system 105 and may be accessed via the network 110. The storage 115 can be distributed across many different computer systems or storage elements and may be accessed via the network 110 or a suitable computer bus interface. The data processing system 105 can store, in one or more regions of the memory of the data processing system 105, or in the storage 115, the results of any or all computations, determinations, selections, identifications, generations, constructions, or calculations in one or more data structures indexed or identified with appropriate values.

Any or all values stored in the storage 115 may be accessed by any computing device described herein, such as the data processing system 105, to perform any of the functionalities or functions described herein. In some implementations, a computing device, such as a client device 120, may utilize authentication information (e.g., username, password, email, etc.) to show that the client device 120 is authorized to access requested information in the storage 115. The storage 115 may include permission settings that indicate which users, devices, or profiles are authorized to access certain information stored in the storage 115. The storage 115 may be similar to or include the storage described herein above in conjunction with FIG. 4. In some implementations, instead of being internal to the data processing system 105, the storage 115 can form a part of a cloud computing system. In such implementations, the storage 115 can be a distributed storage medium in a cloud computing system and can be accessed by any of the components of the data processing system 105, by the one or more client devices 120 (e.g., via one or more user interfaces, etc.), or any other computing devices described herein.

The storage 115 can store one or more player profiles 155 in one or more data structures. Each player profile 155 can be associated with a corresponding player (e.g., a user) of a client device 120 that accesses the functionality of the data processing system 105. In implementations where the data processing system 105 is itself a complete system that operates without using a client device 120 (e.g., a slot machine, a video game machine, etc.), a player profile 155 may correspond to a player that accesses the data processing system 105 to play games. Each player profile 155 can be a user profile that includes information about a user. Each player profile 155 may include information about one or more of the client devices 120 used to access the data processing system 105 using the player profile 155. For example, identifiers of a player profile 155 can be used to access the functionality of the data processing system 105 via the network 110.

The identifiers of player profiles 155 can include a username, a password, an e-mail address, a phone number, a personal identification number (PIN), a secret code-word, device identifiers for use in a two-factor authentication technique, among others. The player profile 155 can store information about historic wagers, contests 160, data records 165, historic games viewed or wagered upon using the player profile 155, historic live event outcomes, and historic wagers (e.g., previously generated data records 165, etc.) previously accessed or joined contests 160 in synchronized groups 280, among other information. The player profile 155 can include a list of synchronized groups 170 and/or a list of contests 160 for one or more synchronized groups 170 that the player has joined. The player profile 155 can store a credit balance, wager information (e.g., an amount of a wager, a timestamp associated with a wager, information about the presence of an indication to participate in a bonus opportunity using the wager, a client device identifier of a client device that was used to place the wager, etc.).

The player profile 155 can store information about a client device 120 used to access the data processing system 105 such as an internet protocol (IP) address, a media access control (MAC) address, a global unique identification (GUID), a player profile 155 name (e.g., the name of a user of the client device 120, a player-chosen username, etc.), device name, among others. In some implementations, a player profile 155 can be created by the data processing system 105 in response to a player profile 155 creation request transmitted by a client device 120. The player profile 155 creation request can include any of the player profile 155 information described herein. In some implementations, a client device 120 accessing the data processing system 105 may not be associated with a player profile 155. In such implementations, the data processing system 105 can automatically create a player profile 155 using an identifier of the client device 120 provided by the client device 120.

The storage 115 can store or maintain one or more contests 160, each associated with multiple player profiles 155. A contest 160 can be organized within one or more data structures that include various data elements related to the contest 160, such as rules, participant information, wagers, selections, and any other relevant details. The contest data structure can be responsive to player actions and interactions, allowing for updates and modifications as the contest progresses. As described herein, the data processing system 105 can create one or more contests 160 in response to receiving a request from a client device 120. Each contest 160 can be a data structure that includes identifiers of the player profiles 155 participating in the contest. The player profiles 155 can be the members of a synchronized group 170 for which the contest is created. The contest 160 can include information accessible to all member player profiles in a synchronized group 170. For example, a contest 160 can feature one or more feeds, including a list of content items related to the contest activities or interactions, which may be sorted or arranged according to predetermined criteria.

A contest 160 can include a set of criteria determined, in some implementations, at the point of generation of the contest 160. The criteria can define the underlying structure and organization of a contest 160, such as the type of contest (e.g., sports betting), interactions (e.g., placing wagers, making selections, etc.), format, and scoring system, among others. For example, a contest 160 may include placing wagers on the outcome of an event or live event. Members of a synchronized group 170 via their player profiles 155 can wager on various aspects of the contest 160, such as the winner, the over/under for the total score, or individual player performance. Additionally, the contest 160 can include a single event and conclude once the event is concluded or may include multiple events, spanning days, weeks, or months. In some implementations, the criteria for a contest 160 may be predetermined, and selected from a set of templates to create the contest 160.

In some implementations, the data processing system 105 can maintain a cumulative point total for each participant of the contest 160. For example, for each correct selection made by a participant, the data processing system 105 can increment their point total by a predetermined value. The participant with the highest accumulated point total at the end of the contest 160 can be determined as the winner. In some implementations, the contest 160 can include associating varying point values to different wager types, including, but not limited to, moneyline betting, point spread betting, over/under betting, and prop bets, among others. More challenging or riskier wagers can be assigned higher point values, while simpler or less risky wagers can be assigned lower point values.

In some implementations, the contest 160 can include engagement rules for placing wagers, making selections, and interacting with the synchronized group 170. For example, the contest criteria can define how players or members of the synchronized group 170 can interact within the synchronized group 170 to accumulate points or to otherwise update a corresponding contest 160. The data processing system 105, as described in further detail herein, can thereby process player interactions performed in connection with a synchronized group 170, and can determine whether said interactions satisfy established contest criteria of any contests 160 associated with said synchronized group 170. The data processing system 105 can analyze each interaction against the contest criteria and update the contest 160 data structure accordingly.

The storage 115 can store or maintain one or more data records 165 associated with each of the one or more player profiles 155, one or more contests 160, or one or more synchronized groups 170, for example, in one or more data structures. As described herein, when a player places a wager, transmits a request to modify their player profile 155, or submits a request to create a contest 160 for a synchronized group 170, the client device 120 (or the application executing thereon) can transmit interaction data to the data processing system 105 via one or more messages in a communication session. The interaction data can include, for example, a time of the interaction, an identifier of a content item, an identifier of another data record 165, an identifier of a data package, an identifier of a synchronized group 170, an identifier of another player profile 155 associated with the content item, an identifier of another actionable object with which the player interacted, identifier(s) of a live event associated with the content item or other actionable object, identifiers of a type of action (e.g., create a contest, participate in a contest, place a wager, tail, fade, share, etc.) performed by the player via the interaction, values corresponding to any input information (e.g., wager amounts, authorization to automatically generate data packages or data records 165 that correspond to existing data records 165, etc.), a wager type (e.g., over/under, prop bet, etc.), or any other information relating to an interaction performed by a player at the client 120.

In some implementations, the client device 120 can transmit interaction data to the data processing system 105 in response to placing a wager via one or more application interfaces. The wager information in the interaction data can include, for example, any input information as part of the wager (e.g., wager amounts, etc.), the player profile 155 associated with the client device 120, a wager type (e.g., over/under, prop bet, etc.), an identifier of a live event or a contest 160 corresponding to the wager, a wager identifier, a condition of a live event or a contest 160 on which the wager was placed, or any other information relating to the wager and/or contest 160. Upon receiving the interaction data, the data processing system 105 can store the interaction data as a data record 165, in association with the player profile 155 that was used to provide the interaction data. The data records 165 can be records of wagers, requests to modify a player profile 155, or any other data relating to contests 160 or live events that may be provided via an interaction at a client device 120. In some implementations, the data processing system 105 can store the data record 165 in association with one or more identifiers of a contest 160 or a wagering opportunity related to the contest 160 identified in the interaction received from the client device 120.

The storage 115 can store or maintain one or more synchronized groups 170 associated with one or more player profiles 155, for example, in one or more data structures. As described herein, the data processing system 105 can create one or more synchronized groups 170 in response to receiving a request from a client device 120 or a broadcast receiver device 120. A synchronized group 170 can be a data structure that identifies a number of player profiles 155 that are members the synchronized group 170. The synchronized group 170 can include information that can be accessed by and provided to each of the member player profiles. For example, each synchronized group 170 can include one or more feeds of content. The feeds can include a list of content items that may be sorted or arranged according to predetermined criteria (e.g., chronologically).

As members of a synchronized group 170, players can place wagers or perform other interactions as described herein using their player profiles 155. The wagers, interactions, or other information relating to the player profiles 155 that are members of the synchronized group 170 can be stored as one or more content items in a content feed of the synchronized group 170. Players can add and remove their player profiles 155 from the synchronized group 170 by transmitting one or more requests to join or leave the synchronized group 170. In some implementations, one or more players can select to participate or ignore participation in a contest 160 created for a synchronized group 170 by transmitting one or more requests to participate in or ignore a specified contest 160.

In some implementations, a player is automatically identified as a participant in a contest 160 associated with a synchronized group 170 if a player profile 150 of the player is identified as a member of the synchronized group 170. As described herein, joining a synchronized group 170 can be facilitated by transmitting a request via a client device 120 to join the synchronized group 170. In some implementations, the data processing system 105 verifies the validity of the request to ensure that the player profile 155 associated with the requesting device is not already associated with the synchronized group 170 for which the contest 160 is generated. Additionally, the data processing system 105 can determine if the player profile 155 is associated with another synchronized group 170 that is not permitted to participate in the contest 160 based on the contest rules, settings, or other restrictions. If the request is valid, the data processing system 105 can authorize the association and update the player profile 155 to update their membership in the synchronized group 170. The data processing system 105 can notify the player and the synchronized group 170 of the successful association. Once a player profile 155 is associated with the synchronized group 170, the player, via their client device 120, can then transmit a request to participate in the contest 160. The request may grant the data processing system 105 permission to access the player's profile data and track their participation in the contest 160.

In some implementations, a player profile 155 may already be associated with the synchronized group 170 for which a contest 160 is generated. Upon receiving a request from the player to participate in a specified contest 160, the data processing system 105 can modify the permissions associated with the player's player profile 155 to update their participation in the contest 160. The specific permissions granted to the player may vary depending on the type of contest and the contest rules. However, some example permissions may include permissions for viewing contest information, placing wagers or making selections, tracking their progress, and interacting with other participants, among others. For example, a player can access details about the contest 160, such as the rules, or scoring system, among others, by transmitting corresponding requests to the data processing system 105 as described herein. Additionally, a player can place wagers or make selections, monitor their progress, or engage with fellow participants through chat or other available features via corresponding graphical user interfaces.

In some implementations, the synchronized group 170 can include data structures storing one or more outcomes of wagers, contests 160, live events, or player interactions (e.g., wagers, score tracking, participating in a contest, etc.) associated with the content items in the content feed(s) of the synchronized group 170. The data processing system 105 can generate or update the synchronized groups 170 based on generated data packages, using the techniques described herein.

Referring now to the operations of the data processing system 105, the request receiver 125 can receive, from a client device 120 associated with a player profile 155, a request to create a contest 160 for a synchronized group 170. The synchronized group 170 established by a synchronized group establisher 150 can include multiple player profiles 155 associated with the synchronized group 170. The contest can correspond to a wide range of predictive challenges related to live or upcoming events, which may include sports betting, esports betting, fantasy sports betting, knowledge-based competitions, and more. The request to create the contest 160 for the synchronized group 170 can be transmitted by a client device 120 via the application executing on the client device 120 and can identify one or more player profiles 155 (or other identifiers such as device identifiers, email addresses, phone numbers, or the like) as invitees. The request to create the contest 160 for the synchronized group 170 may include an interaction or a type of interaction required for participation in a contest 160, such as placing a wager or creating a social media post that is to be included in the feed of the synchronized group 170 upon creating the contest 160.

In some implementations, a member of the synchronized group 170 for which the contest 160 is created can, via their client device 120, transmit a request to the request receiver 125 to access or view the feed of the synchronized group 170. In response to this request, the data processing system 105 can provide an updated feed of the content items generated from the synchronized data structures and/or interactions corresponding to the synchronized group 170, as described herein.

In some implementations within the operations of the data processing system 105, the request receiver 125 can process requests related to the revocation of permission settings associated with player profiles 155 within a synchronized group 170. Upon receiving a request that seeks to revoke permission for a player profile 155 (e.g., a second player profile 155), the request receiver 125 can initiate a modification in the permission settings of the specified player profile 155. The revocation request can be transmitted from a client device 120 associated with the specified player profile 155. In some implementations, the permissions may correspond to a player's ability to engage in various activities/interactions within the synchronized group 170, such as contributing to a group feed, participating in contests 160, or other group-related interactions.

In some implementations, when a client device 120, using a player profile 155 that is a member of the synchronized group 170, submits a request to create a contest 160, the contest generator 130 can generate the contest 160 with specified parameters. The parameters can be specified via graphical user interfaces, such as those described in connection with FIGS. 2A-2H. The parameters can be associated with various conditions or opportunities related to the contest 160. Some non-limiting examples of the contest parameters can include a wager amount, a wager type (e.g., over/under, prop bet, etc.), an identifier of an event or a live event the contest 160 is based upon, an identifier of the wager request, an identifier of the opportunity on which the wager was placed, a time the wager was placed, or any other information relating to the contest 160.

In some implementations, to generate a contest 160 for a synchronized group 170 using a player profile 155, the player profile 155 can be an owner or host of the synchronized group 170. For example, upon receiving a request, the contest generator 130 can determine that the player profile 155 used to create the contest 160 for a synchronized group 170 is a host of the synchronized group 170. In some implementations, player profiles 155 identified as members of a synchronized group 170 can be used to create contests 160 for the synchronized group 170. For example, player profiles 155 that can create contests 160 for a synchronized group 170 may include other player profiles 155 identified in the synchronized group 170 as participants or invitees. To generate a contest 160, the contest generator 130 can allocate a region of memory in the storage 115 specifically for the new contest 160, and can associate the generated contest 160 with the synchronized group 170 identified in the request. If the player profile 155 is identified as the host of the contest 160, the contest generator 130 can store an association between the contest 160 and the host player profile 155. Additionally, for player profiles 155 identified as participants or members of the synchronized group 170, the contest generator 130 can transmit a notification to respective client devices 120 corresponding thereto to provide interactive user interface elements that notify players of the contest 160, and in some implementations, enable players to indicate whether to participate in the contest 160.

In some implementations, client devices 120 can transmit a request to participate in a contest 160 within a synchronized group 170. Certain contests within these groups may allow players to join based on specific criteria defined by the contest generator 130, such as placing a qualifying bet (e.g., for a private contest), or might be open to any player profile 155 (e.g., for a public contest). For example, when the contest generator 130 generates a contest 160 for a synchronized group 170, the contest generator 130 (or the client device 120) can generate condition for entry based on the specified parameters for the contest 160, such as a minimum bet or a specific event to bet on. This entry requirement can be communicated as a content item and displayed on the client devices 120 associated with the synchronized group 170 for which the contest 160 is generated. Players can transmit wagers to the data processing system 105 in accordance with the contest rules via their client application, and the client device 120 can transmit these betting details as a request to participate in the contest 160.

In some implementations, the contest generator 130 can process each participation request to confirm the eligibility of player profiles 155 according to predefined criteria. The predefined criteria may include verifying the identity of each participant (or player profile 155) to prevent impersonation, examining previous contest involvement for potential conflicts of interest, evaluating the suitability of devices used for access, and enforcing geographical constraints as per regulatory needs, among others. In some implementations, instead of processing each player's eligibility individually, the contest generator 130 can automatically grant participation to all players who belong to the synchronized group 170 associated with the contest 160. In this regard, the content generator 130 can operate under the assumption that membership in a synchronized group 170 implies adherence to predefined eligibility criteria, including, but not limited to, identity verification, device suitability, geographical restrictions, etc.

Upon receiving at least one interaction from a client device 120 that is a member of the synchronized group 170 for which the contest 160 is created, the interaction receiver 135 can process activities/interactions related to the contest 160 within the synchronized group 170. For example, this may include interpreting and analyzing different types of interactions, whether they are contest entry submissions, responses to contest updates, or decisions regarding contest participation, among others. In some implementations, the interaction receiver 135 can register a player's decision to participate in or withdraw from the contest 160 by analyzing the interaction data received from the client device 120. The interaction data may include, but is not limited to, player identity verification, the timestamp of the interaction, and specific contest-related selections made by the player via the client device 120. The interaction receiver 135 can validate the interactions in accordance with the status and rules of contest 160.

In some implementations, the interaction receiver 135 can process various contest-related queries from players, such as requests for current standings, rules, or schedules within the contest. The interaction receiver 135 can process conditional interactions, such as automatic participation in certain stages of the contest 160 based on predefined player preferences or past performance within the synchronized group 170. In cases involving complex interactions, such as a player amending a previous decision or responding to a time-sensitive contest event, the interaction receiver 135 can analyze the context and timing of the interaction, ensuring accurate and timely processing in alignment with the dynamic nature of the contest 160. In some implementations, the interaction receiver 135 can enable players to submit and specify parameters, such as wager amount, target outcome, and other relevant details, as described herein. The interaction receiver 135 can validate each submitted wager against the predefined contest rules to determine compliance with established rules. The interaction receiver 135 can maintain the status of each wager throughout the contest 160, updating it based on contest progress. In some implementations, the interaction receiver 135 can enable the definition and enforcement of various wager parameters, including, but not limited to, different wager types (e.g., single bet, combination bet, or conditional bet, etc.), wager amount (e.g., specifying wager amount, etc.), target outcome (e.g., wagering on a particular outcome, etc.), time limits (e.g., specifying any deadlines for placing wagers or making changes), and outcome parameters (e.g., identifying the outcome of a contest 160 the player is wagering on), among others.

The interaction receiver 135 can communicate the interaction received from at least one client device 120 (e.g., a member of the synchronized group 170) to the group updater 140. The group updater 140 can update one or more data structures of the contest 160 based on received interaction data to reflect the latest activities/interactions within the synchronized group 170. The interaction data can range from contest entries and player decisions to more complex elements (e.g., real-time responses). In some implementations, the group updater 140 can maintain synchronization across multiple client devices 120, providing each client device 120 in the synchronized group 170 with immediate access to updated contest information (e.g., via various content items described herein). In some implementations, if a player profile 155 opts out of the contest 160 via their client device 120, the interaction receiver 135 can process this withdrawal and request an update via the group updater 140 to update the participation list for the contest 160 to remove the player profile 155.

In some implementations, the group updater 140 can receive information about permission settings from the interaction receiver 135, which communicates data from at least one client device 120 associated with a player profile 155 (e.g., a second player profile 155 in this example) that performed an interaction. The interaction can include data related to the contest 160, such as entering the contest 160, placing a wager, responding to a contest event, or any other authorized activity within the synchronized group 170. The group updater 140, upon receiving the data, can process the permission settings to confirm whether the second player profile 155 has the authorization to perform actions within the synchronized group 170.

The group updater 140 can analyze the received interaction data (e.g., associated with each player's actions, such as successful completions of tasks, participation in events, and wagering outcomes) to determine its impact on a player's score. In some implementations, based on the predefined scoring rules and/or the above analysis, the group updater 140 can update the individual scores for each player of a synchronized group 170. In some implementations, the score can be reflected in the data structure corresponding to the group feed to provide contest-related information or rankings within the synchronized group 170.

In some implementations, scores can be updated based on wagering to determine scores within a contest 160. For example, winning wagers can increase a player's score, with the increase being directly proportional to both the wager amount and/or the associated odds. Conversely, unsuccessful wagers can cause deductions from a player's score, and the extent of the deduction can vary based on the wager amount and/or the associated odds. Additionally, in some implementations, placing a wager itself, regardless of the wager's outcome, can contribute to a player's score. For example, in some implementations, the data processing system 105 can award a fixed number of points for every wager placed, regardless of the amount or odds. Additionally, in some implementations, the data processing system 105 can award points based on the wager amount, with higher wagers resulting in greater rewards. In some implementations, the data processing system 105 can use risk-taking and/or wagering to determine rewards.

In some implementations, the group updater 140 can maintain and update the synchronized group feed used for communication and information sharing within the synchronized group 170. When a player performs an interaction, such as entering the contest 160, placing a wager, or responding to a contest event, the group updater 140 adds relevant information to the feed. The information may include content items, interaction indicators, updates, etc. In some implementations, the content item can include textual updates, images, videos, or other media formats that provide context or details about the interaction. The indicator can inform other members within the group about the actions taken by the player, such as entering the contest 160, placing a wager, or responding to an event. The updates can relate to current standings, upcoming events, or any changes to the contest rules.

In some implementations, the group updater 140 can manage the timing of contests 160 within the synchronized group 170. For example, the group updater 140 can receive via the contest generator 130 data specifying an expiration time of a contest 160. The expiration time may be stored in a standardized format for consistency. The group updater 140 can periodically monitor the current time, usually through an internal clock or by syncing with an external time source, and compare it against the expiration time of the contest 160. When the group updater 140 identifies that the current time has exceeded the expiration time, the group updater 140 can update the status of the contest 160, for example, by changing its data record from "active" to "expired" or similar.

In some implementations, the group updater 140 can enforce time-based restrictions. For example, when the contest 160 reaches its expiration time, the group updater 140 can update the status indicator of the contest 160 to show its conclusion. In some implementations, the group updater 140 can update the access permissions associated with the player profiles 155 within the synchronized group 170, specifically the player profiles 155 for which the contest 160 was initially created. This update to the player profile 155 can restrict or prevent the player profile 155 from submitting any further entries or interacting with contest-related features after the contest has expired.

In response to a request, the feed provider 145 can provide a feed of the synchronized group 170. The feed can include one or more content items, each generated based on data corresponding to contest activities and interactions of player profiles 155 within the synchronized group 170. Each content item can include information such as an identifier of the contest 160, an identifier of the player profile 155 that requested the creation of the contest 160, and identifiers of player profiles 155 that responded to the contest 160, for example, by placing a wager.

Additionally, the content item can display information about the participating player profiles. For example, the content item via the feed provider 145 can provide attributes of a contest 160. For example, the content item can include a contest ID, which can be an identifier of a contest 160. Additionally, the content item can include, but is not limited to, creator ID, sport type, bet limits, odds limits, contest status, expiration time, and even information, among others. The creator ID can be the identifier of the player profile 155 who created the contest 160. The sport type can specify a sport or event the contest 160 is based on. The bet limits can identify minimum and maximum wager amounts allowed for the contest 160. The content item can include odds limits, specifying the minimum and maximum odds allowed for wagers. The contest status can inform players whether the contest 160 is currently active, inactive, or expired. The expiration time can establish the deadline for wagers or participation, e.g., by adding a time dimension to the contest 160. Additionally, for enhanced context, event information can be included, providing details such as the date, time, and/or participants if the contest 160 is associated with a specific event.

In some implementations, the feed provider 145 can provide contest-related information via a dynamic feed, including responder IDs (identifying players actively engaged with contest 160), response actions (describing specific actions of each player such as wagering, challenges, or comments), and points (offering updates on individual standings and point totals). In some implementations, the feed provider 145 can dynamically update and sort the feed in real-time or near real-time, responding to new interactions that are relevant to the contest 160. The delivery of the contest-focused feed can involve the feed provider 145 transmitting display instructions that cause the client device 120 to display the feed of the one or more content items. The display instructions may include JavaScript, hypertext markup language 5 (HTML5) data, or other types of display instructions. In some implementations, the display instructions can cause the client device 120 to generate and display the content items to include the information in the data packages generated by the data processing system 105. In some implementations, the data processing system 105 generates the content items, and the display instructions cause the client device 120 to arrange the content items in the feed according to predetermined criteria (e.g., sorting in chronological order, relevance to an ongoing contest 160, ranking by priority, associations with other player profiles 155 that placed wagers in the synchronized groups 170, or other types of ranking policies).

In some implementations, the feed provider 145 can provide scores for each player profile 155, with points calculated based on the number of bets or similar interactions made by each player profile 155. The feed provider 145 can provide each player's betting activity within the contest 160, aggregating data on the number of bets placed, their nature, and outcomes. After calculating the scores, the feed provider 145 can compile the results into content items. The content items can be formatted into data structures optimized for visual display on client devices 120. In some implementations, the content items can show the points scored by each player profile 155, and the feed provider 145 can contextualize them within the broader framework of the contest 160, providing a comprehensive overview of each participant's performance.

Figure 2A:
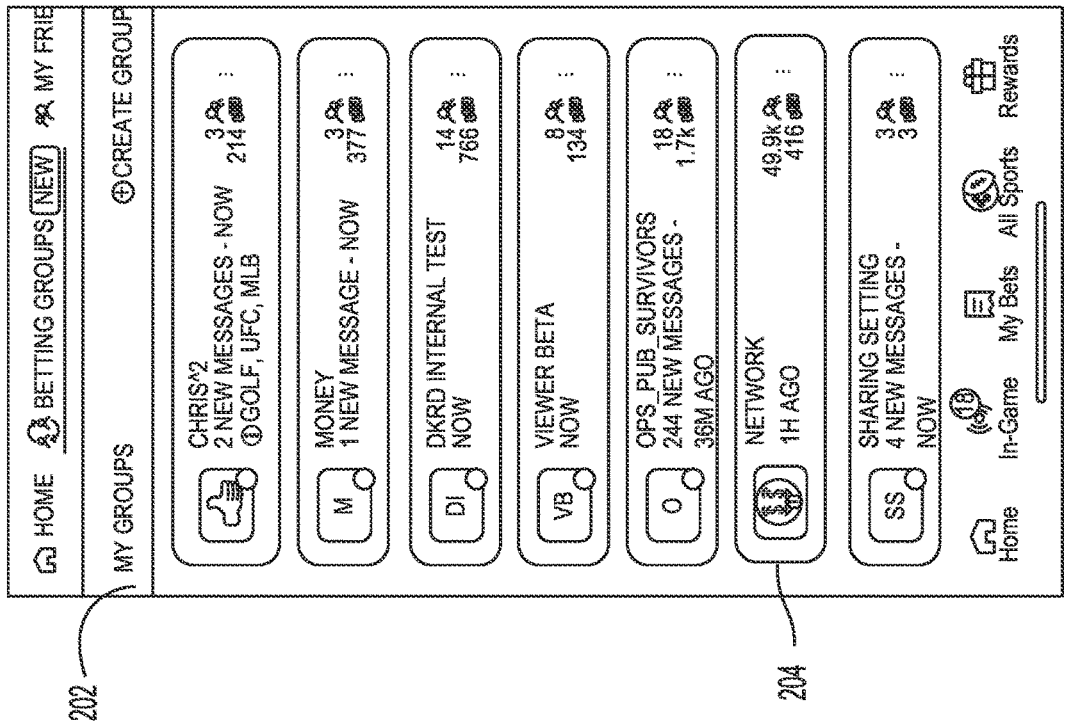

Referring now to FIG. 2A in the context of the components of FIG. 1, illustrated is an example user interface 200A, showing a list of synchronized groups 170 that a player accessing the data processing system 105 can access using a player profile 155. As shown, the user interface 200A includes a list 202 of synchronized groups 170. Each synchronized group 170 can be presented as a respective content item, shown here as content items 204. Each content 204 item includes information related to the synchronized group 170, including, but not limited to, an identifier (e.g., a name) of the synchronized group 170, an identifier of a number of player profiles 155 that are members of the synchronized group 170 (or those accessing the functionality of the data processing system 105), and a count of messages sent within the synchronized group 170. Each content item 204 can be an interactive content item, which, when interacted with, causes the application presenting the user interface 200A to show a content feed of the selected synchronized group 170. The data processing system 105 (e.g., via the request receiver 125) can receive a request to view the synchronized group 170 and provide the content feed (e.g., via the feed provider 145) to the requesting client device 120 in a user interface, such as the user interface depicted in FIG. 2B.

Figure 2B:
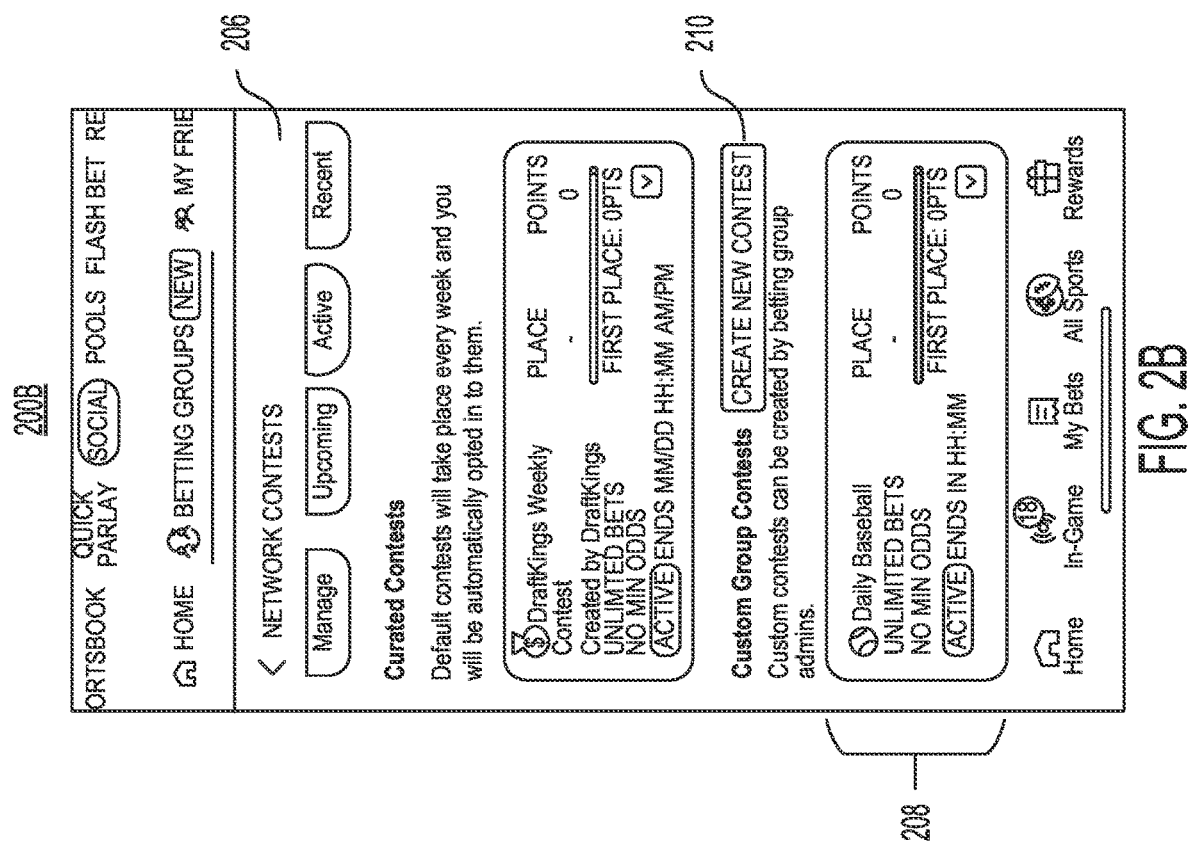

Referring now to FIG. 2B, illustrated is an example user interface 200B, which shows a feed 206 of one or more content items (e.g., "Network" shown in FIG. 2A). As shown, the feed 206 includes an identifier (e.g., a name) of the synchronized group 170. The user interface 200B may be displayed, for example, upon selection of a synchronized group 170 shown in the user interface 200A of FIG. 2A. When a user selects a synchronized group 170 displayed on the user interface 200A, the interface transitions to provide detailed information about various contests associated with that synchronized group 170 in the user interface 200B. The contests 160, including curated contests and custom group contests, are displayed as contest groups, with each contest group including several contests shown as content items 208 within the feed 206. Each content item 208 in the feed 206 can provide attributes of a contest, such as the sport type, bet limits, odds limits, and status of the contest (active, non-active, or expired), along with the expiration time corresponding to an event or a live event. Placement and points in the contest can also be outlined in the content item 208. Additionally, each content item 208 in the feed 206 can include an actionable object 210, such as an option to create a new contest. Interaction with the actionable object 210 can cause the application presenting user interface 200B to transition to a contest generation interface, such as the user interface depicted in FIG. 2C.

Figure 2C:
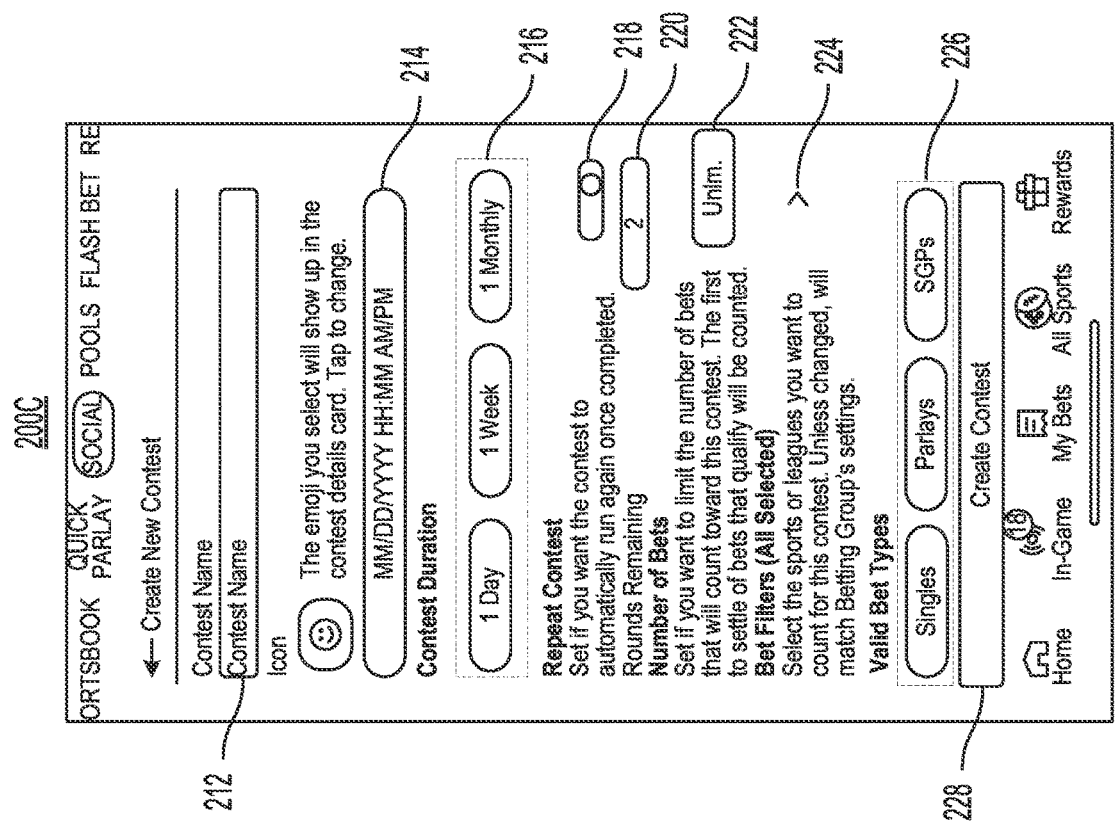

Referring now to FIG. 2C, illustrated is an example user interface 200C, which is generated following a request from a client device 120 using a player profile 155 to generate a contest 160 for a synchronized group 170. As shown, the user interface 200C displays one or more sections, each dedicated to a specific aspect of contest configuration. For example, at the top of the user interface 200C, a name entry box 212 enables a player to enter a name for a contest 160. When a player inputs a contest name into the name entry box 212, the data processing system 105 verifies its status. For example, the data processing system 105 verifies whether the entered name is active or already being used by any other synchronized group 170, of which the player profiles 155 for the synchronized group 170, for which the contest is being created, are members. If the suggested name is not currently in use, the data processing system 105 provides feedback to enable the user to navigate the remaining steps of contest generation.

Upon receiving the contest name, the data processing system 105 further processes the player's inputs via the associated client device 120 regarding the start date and time, duration, and other parameters of the contest 160. Located below the name entry box 212 in the user interface 200C, an interactive date and time entry box 214 enables a player to input a start date and time for the contest 160. In some implementations, the interactive date and time entry box 214 can display a drop-down menu upon interaction, enabling a player to select a date and time for the contest 160. In some implementations, the user interface 200C can present a contest duration block 216 that includes predefined durations for the contest 160. The predefined durations can correspond to time lengths such as 1 day, 1 week, or 1 month. The predefined durations can be presented as radio buttons, drop-down menus, or other interactive elements.

In some implementations, the data processing system 105 can use the data provided through the user interface 200C to automatically initiate contests at predetermined dates. For example, when a player interacts with the interactive date and time entry box 214 to specify a start date and time for the contest 160, the data processing system 105 can process the specified start date and time and may schedule the contest launch accordingly. Additionally, the predefined durations offered by the contest duration block 216 can be integrated into the automated contest initiation process. For example, when a user interacts with the contest duration block 216 to select a desired duration, such as 1 day, 1 week, or 1 month, the data processing system 105 can automatically calculate the contest duration based on the player's selection and conclude the contest 160 at the designated time.

In some implementations, the user interface 200C can present a repeat contest toggle 218 that enables or disables the repetition of a contest 160. Upon enabling the repeat contest toggle 218, the user interface 200C is dynamically updated to display additional options for a player to specify the number of rounds. For example, when the repeat contest toggle 218 is turned on, the user interface 200C presents a text field box 220, where the player can input the desired number of rounds. Once the player inputs a number (e.g., any positive integer), the data processing system 105 uses the data to automatically initiate the contest for the specified number of rounds.

In the center of user interface 200C, the user interface 200C displays options for selecting various parameters, including the number of bets, bet filters, and valid bet types. The number of bets box 222 enables a player to specify the maximum number of bets allowed for a contest 160. The number of bets box 222 can be a text field or an interactive element that enables players to input a numerical value. Players can specify the desired maximum number of bets for a contest 160. The data processing system 105 validates the entered value to ensure it is a positive integer within an acceptable range. If the entered value exceeds the allowed range, an error message may be displayed on the user interface 200C prompting the player to enter a valid number. In some implementations, the number of bets box 222 may include a default option that sets the bet limit to unlimited. The default option can be shown as a checkbox, a radio button, or a placeholder value displayed in the text field.

Figure 2D:
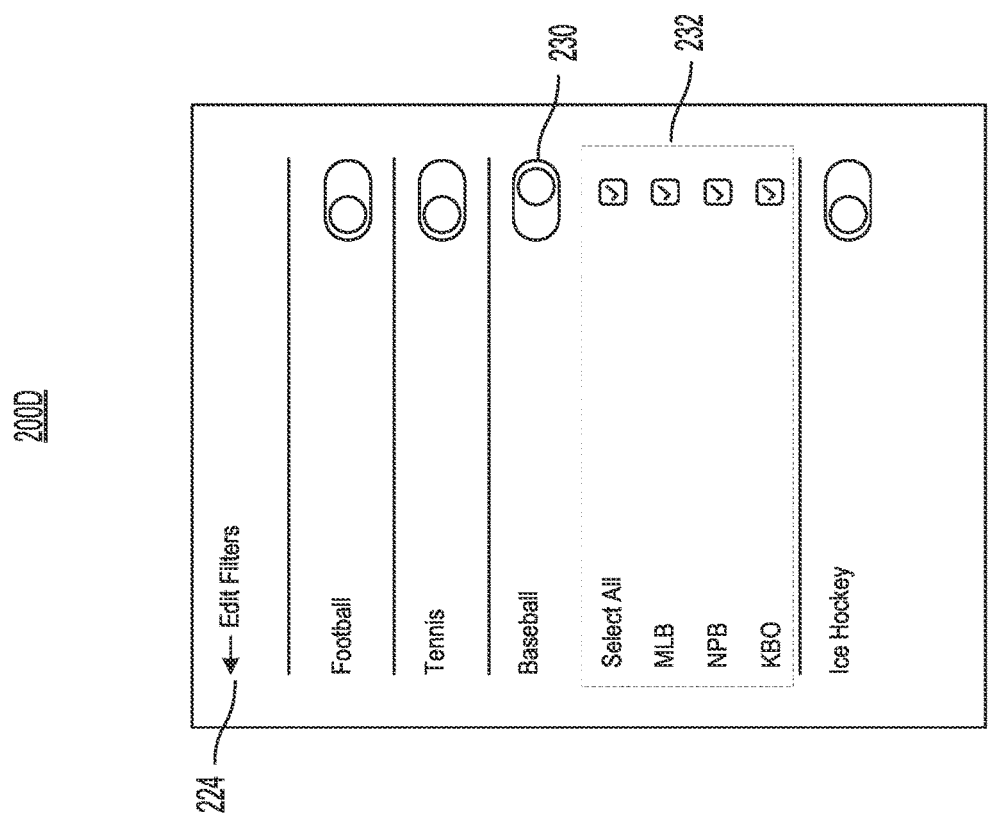

A player can select specific sports or leagues (e.g., event types in some implementations) to be included in a contest 160 by interacting with the bet filters button 224. The bet filters button 224, when interacted with, causes the application presenting the user interface 200C to transition to a second interface (e.g., 200D), as shown in FIG. 2D. The bet filters button 224, upon interaction, categorizes a contest 160 into different sport parameters (or event types), including various sporting disciplines such as football, tennis, baseball, and ice hockey, among others. Each sport category can be an interactive toggle 230, as illustrated in FIG. 2D. When a player enables a sport toggle, the data processing system 105 updates the user interface 200D to display the associated league options for that sport. In some implementations, the data processing system 105 identifies the selected sport based on the toggled element and retrieves the league data associated with the selected sport from the storage 115. For example, upon interacting with the baseball toggle 230, the user interface 200D can display associated league options such as MLB, NPB, or KBO. A player can select individual leagues by interacting with their respective checkboxes 232. In some implementations, a "select all" checkbox may be provided to automatically select all leagues for the chosen sport.

Referring back to FIG. 2C, the user interface 200C displays various betting attributes 226, corresponding to different bet types such as singles, parlays, and SGPs (Same Game Parlays). Each attribute can be an interactive element within the interface 200C. A player can select a bet type 226 by interacting with it. When a player interacts with a specific bet type 226, the data processing system 105 updates the data structure that defines the contest rules. The user interface 200C also displays an actionable object 228, which, when interacted with, causes the data processing system 105 to generate a contest 160 using a synchronized data structure and associate the contest 160 with a synchronized group 170, as described herein. Additionally, interacting with the actionable object 228 can cause the application presenting the user interface 200C to transition to a wager selection interface, such as the user interface depicted in FIG. 2E.

Figure 2E:
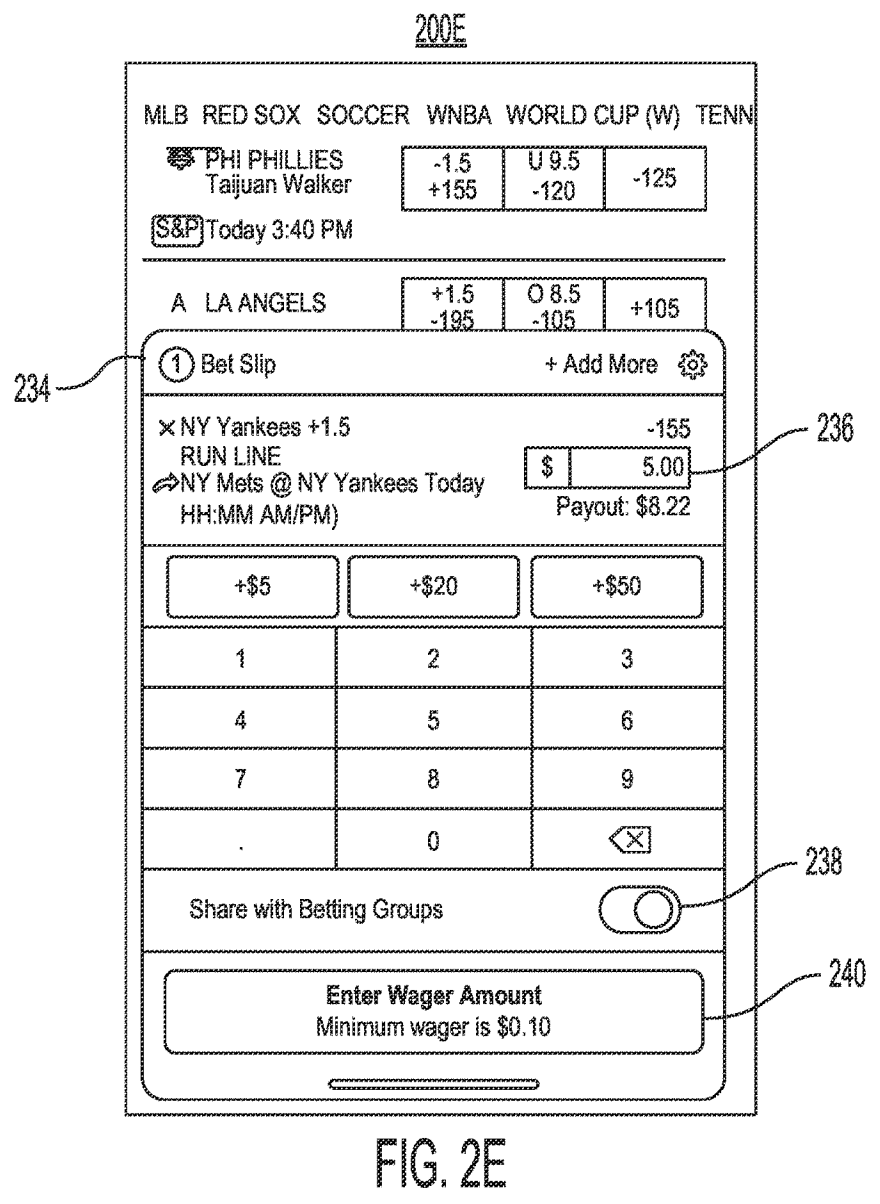

Referring now to FIG. 2E in the context of the components described in connection with FIG. 1, illustrated is an example user interface 200E that includes interactive elements enabling a player to place wagers (e.g., request generation of one or more data records). A data record may refer to interaction data such as a player's wager, including details such as the wager amount, odds, and other pertinent information. The data processing system 105 stores the interaction data as a data record, associated with the player profile 155 that initiated the interaction. The data record can include a range of interactions, from wagers and requests to modify a player profile 155 to other data related to contests, events, or live events initiated via a client device 120. In some implementations, the data processing system 105 associates the data records with specific identifiers, which may relate to a particular contest or a wagering opportunity within that contest, as identified in the interaction received from a client device 120.

After a data record is generated in response to a request, the data processing system 105 can transmit display instructions to a client device 120, causing display of an overlay 234, as shown in FIG. 2E. The overlay 234 shows the data record parameters (e.g., wager information such as odds, bet amount, etc.) of the one or more generated data records. Although data record parameters of only one data record are shown in the overlay 234, it should be understood that the overlay 234 can display data record parameters from any number of data records, with the parameters of each data record being displayed.

Each overlay 234 can include interactive elements that enable players to place wagers on the contest 160. For example, a player can interact with a wager region 236 to directly input a wager amount for a contest 160. The wager region 236 can be an interactive button with which a player can interact to place a wager. In some implementations, a player can type the wager amount into a text box or use other input mechanisms. The data processing system 105 validates the entered wager amount to ensure it complies with the contest's rules and limitations. In some implementations, the overlay 234 may display predefined wager amounts, such as +$5, +$20, or +$50, which can be presented as buttons or interactive elements that, when interacted with, cause the data processing system 105 to automatically increment the wager amount in the wager region 236. In some implementations, the overlay 234 may present an interactive numerical pad, which generally includes a grid of buttons or interactive elements representing various numerical values (e.g., positive integers). A player can select the wager amount by interacting with the corresponding buttons on the pad, and the selected value is then reflected in the wager region 236.

In addition to displaying wager elements, the overlay 234 can include an interactive element 238 to publish or share data record associated with their wagers for a contest 160 of one or more synchronized groups 170. In some implementations, the data processing system 105 may automate the publishing or sharing of the data record with one or more synchronized groups 170 that are associated with corresponding permissions in the player profile 155. This automation can be achieved by generating one or more data packages that present a content item corresponding to the generated data record or contest within the feed of a synchronized group 170.

In some implementations, the data package can include a subset of the data record parameters of the data record that are suitable for sharing in a social media platform. To generate the data package, information such as contest corresponding to an event or live event on which the wager was placed, the odds of the wager opportunity at the time the wager was placed, the time the wager was placed, an identifier of the player profile 155 that placed the wager, and information relating to the wager opportunity and type of wager, among others, can be extracted from the generated data record and stored as part of the data package. In some implementations, preferences in the player profile 155 can indicate which portions of generated data records can be used to generate the data package. In some implementations, these preferences can be changed on the basis of each synchronized group 170. The various preferences in the player profile 155 that authorize the automatic generation of data packages for user-selected synchronized groups 170, and that authorize particular portions of data records to be included in data packages generated for particular synchronized groups, can be modified using the client devices 120.

Additionally, a player can use a client device 120 to manually request sharing of a data record with one or more user-selected synchronized groups 170, and the data processing system 105 can generate corresponding data packages for those user-selected groups. Once generated, each data package can be stored in association with the synchronized group 170 for which it was generated. In some implementations, the data processing system 105 can monitor changes in various conditional opportunities (e.g., wager opportunities) for which data records were generated and update the data records upon detecting changes in the contest corresponding to the conditional opportunities, or upon detecting changes to the conditional opportunities. When an update to a data record is generated, the data processing system 105 can generate corresponding data packages for each data record to replace each of the previously generated data packages for the data record. The updated data packages can be stored in association with the corresponding synchronized groups 170 and, in some implementations, may remove or replace the previously generated data packages.

In some implementations, in addition to sharing the data record by interacting with the interactive element 238 as described herein, a player can interact with an actionable object 240 that, when interacted with, causes the application presenting the user interface 200E to show a confirmation page interface, such as the user interface depicted in FIG. 2F.

Referring now to FIG. 2F in the context of the components described in connection with FIG. 1, illustrated is a user interface 200F showing an overlay 242 that may be displayed in a web-based browser or native application. The overlays of the various user interfaces described herein need not be overlays, and may be any type of frame, pop-up, notification, alert, or user interface container. As shown, the overlay 242 in the user interface 200F confirms the details of the contest 160 or the specific data record parameters that are set to be shared with a synchronized group 170. The parameters displayed in the overlay 242 can include relevant contest data, such as an identifier of the event, a timestamp indicating the time at which the contest 160 will begin, a wager amount placed on a contest 160 (or set for a contest 160), and a potential total payout amount that could be gained if the wager is successful. In addition to the primary parameters, the overlay 242 may also display additional information related to the contest or data record, such as an identifier of the player profile 170 responsible for generating the contest and the date and time when the contest was generated.

In some implementations, the overlay 242 can include an interactive element 244 that the player can interact with. The interactive element 242 can be a drop-down menu, a search bar, or a group selection list. When a player interacts with the interactive element 244, the data processing system 105 updates the user interface 200F to display one or more synchronized group(s) 170. The synchronized groups 170 can be relevant to the player's preferences, can be those in which the player is a member, or can be aligned with the specific settings of the contest 160 or data record parameters.

In some implementations, a player can select the relevant synchronized group(s) 170 and then interact with an actionable object 248, shown at the bottom of the overlay 240. Upon interacting with the actionable object 248, the client device 120 associated with the player profile 155 can transmit a request to the data processing system 105 to generate a data package for the selected group(s) 170 and show the data package as a feed of one or more content items. In some implementations, an interactive element 246 may be displayed on the overlay 242. When interacted with, the interactive element 246 may cause the data processing system 105 to automatically share the contest details or data record parameters with a synchronized group 170 (or relevant synchronized groups 170 in some implementations) for which the contest is generated and of which the player profile 155 is a member, as shown in connection with FIG. 2G.

Figure 2G:
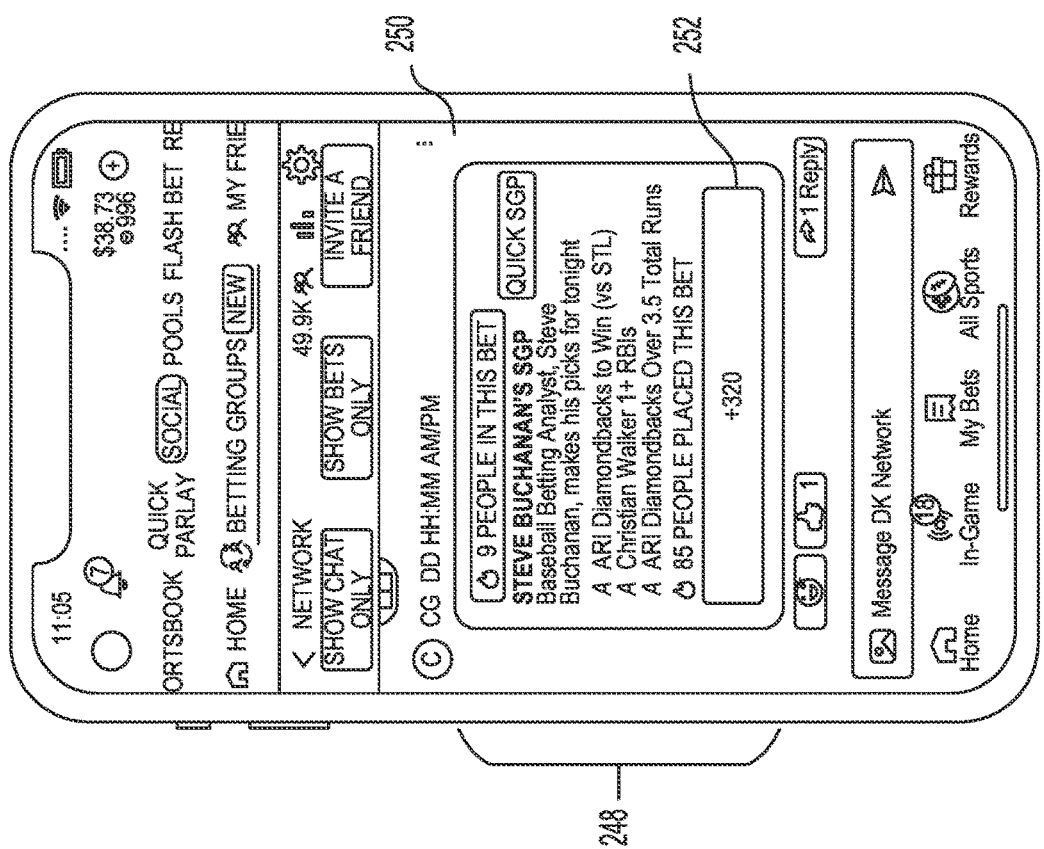
Figure 2H:
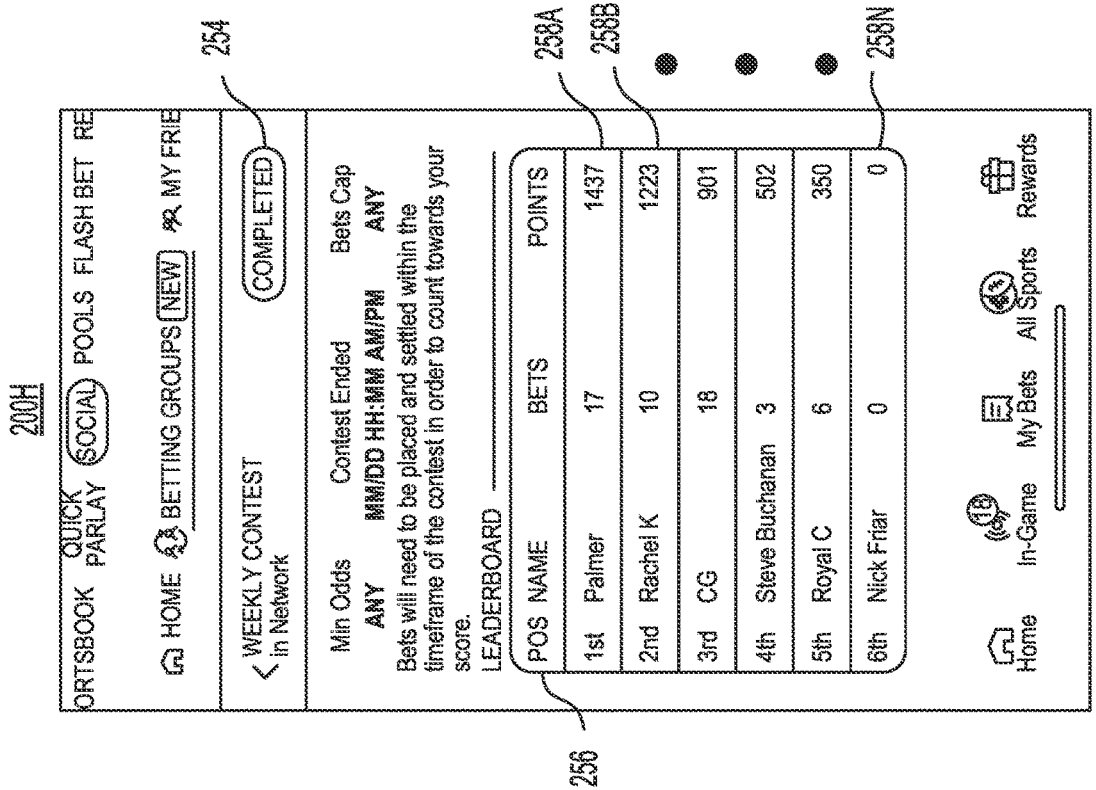

Referring now to FIG. 2G, depicted is an example user interface 200G, which shows a feed 250 of one or more content items 248. As shown, the feed 250 includes a content item 248 (e.g., a contest 160) associated with a player profile 155. The content item 248 includes an identifier of the associated event, the type of wager (e.g., parlay or single), a numerical value indicating the number of player profiles 155 who have placed wagers on the contest, parameters specifying the sport discipline associated with the contest 160, and the associated odds indicator 252. The odds indicator 252 can provide a potential financial return for a given wager outcome. Positive odds indicate a potential profit, while negative odds indicate a required wager amount to achieve a specific profit. The odd indicator 252 displayed in a content item (e.g., +320) can indicate the potential profit relative to the wager amount. For example, if the odds are +320 and a player wagers $100, upon winning the wager, the player may receive a payout of $320, resulting in a total profit of $220 (including the initial wager amount). Upon the conclusion of the contest 160, the data processing system 105 records the points accumulated by each player who placed a wager on the contest 160. Subsequently, the user interface 200G is dynamically updated to present a leaderboard of points, as depicted in FIG. 2H Referring to FIG. 2H, illustrated is an example user interface 200H, which shows a leaderboard of one or more contests 160. As shown, the user interface 200H displays an indicator 254 indicating that the contest 160 has been completed. Upon determining that the contest 160 has been completed, the data processing system 105 retrieves the relevant data from the storage 115, including the player profile identifiers, the number of bets placed by each player, and the accumulated points for each player. Further, the user interface 200H is updated to present a leaderboard 256, which provides an overview of each player performance and the contest outcome. The leaderboard 256, as shown, can include multiple rows, such 258A-258N, with each row providing information about a corresponding player. The rows can be organized in descending order based on the accumulated points of each player. Additionally, each row can provide information about the ranking of each player, the name associated with the player profile corresponding to that row, the total number of wagers placed by the player throughout the contest 160, and the accumulated points for the player.

In some implementations, the leaderboard 256 can be populated and updated in real-time as players place wagers. For example, when a player placed a new wager, the data processing system 105 identifies the newly placed wager and extracts the relevant information, such as the player identifier, the wager amount, and the wager selection. The data processing system 105 calculates the corresponding point adjustment for the player based on the wager value, wager outcome, and contest rules. Additionally, the data processing system 105 updates the leaderboard 256 by adjusting the points accumulated by a player and rearranging the rows in the leaderboard rows based on the updated points.

Figure 3:
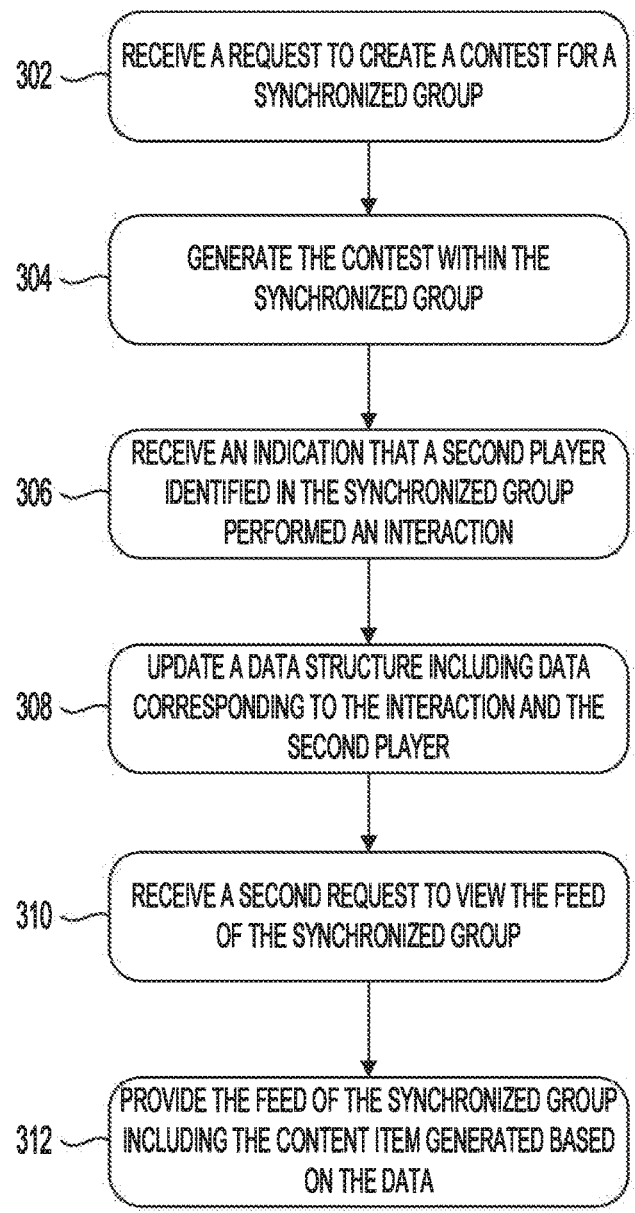
FIG. 3 illustrates an example flow diagram of a method for creating synchronized data structures for synchronized groups, in accordance with one or more implementations.

Referring now to FIG. 3, depicted is an illustrative flow diagram of a method 300 for creating synchronized data structures for synchronized groups. The method 300 can be executed, performed, or otherwise carried out by the data processing system 105 or any other computing devices described herein. In brief overview of the method 300, the data processing system (e.g., the data processing system 105, etc.) can receive a request to create a contest for a synchronized group (STEP 302), generate the contest within the synchronized group (STEP 304), receive an indication that a second player identified in the synchronized group performed an interaction (STEP 306), update a data structure including data corresponding to the interaction and the second player (STEP 308), receive a second request to view the feed of the synchronized group (STEP 310), and provide the feed of the synchronized group including the content item generated based on the data (STEP 312).

In further detail of the method 300, the data processing system can receive a request to create a contest for a synchronized group (e.g., the synchronized group 170) (STEP 302). In some implementations, the data processing system can receive, from a client device associated with a player profile, a request to create a contest for a synchronized group. The synchronized group established by a synchronized group establisher can include multiple player profiles associated with the synchronized group. The contest can correspond to a wide range of predictive challenges related to live or upcoming events, which may include sports betting, esports betting, fantasy sports betting, knowledge-based competitions, and more. The request to create the contest for the synchronized group can be transmitted by a client device via the application executing on the client device and can identify one or more player profiles (or other identifiers such as device identifiers, email addresses, phone numbers, or the like) as invitees. The request to create the contest for the synchronized group may include an interaction or a type of interaction required for participation in a contest, such as placing a wager or creating a social media post that is to be included in the feed of the synchronized group upon creating the contest.

In some implementations, the data processing system can process requests related to the revocation of permission settings associated with player profiles within a synchronized group. Upon receiving a request that seeks to revoke permission for a player profile (e.g., a second player profile), the data processing system can initiate a modification in the permission settings of the specified player profile. The revocation request can be transmitted from a client device associated with the specified player profile. In some implementations, the permissions may correspond to a player's ability to engage in various activities/interactions within the synchronized group, such as contributing to a group feed, participating in contests, or other group-related interactions.

Upon receiving a request, the data processing system can generate a contest within the synchronized group (STEP 304). In some implementations, to generate a contest for a synchronized group using a player profile, the player profile can be an owner or host of the synchronized group. For example, upon receiving a request, the data processing system can determine that the player profile used to create the contest for a synchronized group is a host of the synchronized group. In some implementations, player profiles identified as members of a synchronized group can be used to create contests for the synchronized group. For example, player profiles that can create contests for a synchronized group may include other player profiles identified in the synchronized group as participants or invitees. To generate a contest, the data processing system can allocate a region of memory in the storage specifically for the new contest and can associate the generated contest with the synchronized group identified in the request. If the player profile is identified as the host of the contest, the data processing system can store an association between the contest and the host player profile. Additionally, for player profiles identified as participants or members of the synchronized group, the data processing system can transmit a notification to respective client devices corresponding thereto to provide interactive user interface elements that notify players of the contest, and in some implementations, enable players to indicate whether to participate in the contest.

The data processing system can receive an indication that a player (e.g., a member) identified in the synchronized group performed an interaction (STEP 306). In some implementations, upon receiving at least one interaction from a client device that is a member of the synchronized group for which the contest is created, the data processing system can process activities/interactions related to the contest within the synchronized group. For example, this may include interpreting and analyzing different types of interactions, whether they are contest entry submissions, responses to contest updates, or decisions regarding contest participation, among others. In some implementations, the data processing system can register a player's decision to participate in or withdraw from the contest by analyzing the interaction data received from the client device. The interaction data may include, but is not limited to, player identity verification, the timestamp of the interaction, and specific contest-related selections made by the player via the client device. The data processing system can validate the interactions in accordance with the status and rules of contest.

In some implementations, the data processing system can process various contest-related queries from players, such as requests for current standings, rules, or schedules within the contest. The data processing system can process conditional interactions, such as automatic participation in certain stages of the contest based on predefined player preferences or past performance within the synchronized group. In cases involving complex interactions, such as a player amending a previous decision or responding to a time-sensitive contest event, the data processing system can analyze the context and timing of the interaction, ensuring accurate and timely processing in alignment with the dynamic nature of the contest.

In some implementations, the data processing system can enable players to submit and specify parameters, such as wager amount, target outcome, and other relevant details, as described herein. The data processing system can validate each submitted wager against the predefined contest rules to determine compliance with established rules. The data processing system can maintain the status of each wager throughout the contest, updating it based on contest progress. In some implementations, the data processing system can enable the definition and enforcement of various wager parameters, including, but not limited to, different wager types (e.g., single bet, combination bet, or conditional bet, etc.), wager amount (e.g., specifying wager amount, etc.), target outcome (e.g., wagering on a particular outcome, etc.), time limits (e.g., specifying any deadlines for placing wagers or making changes), and outcome parameters (e.g., identifying the outcome of a contest the player is wagering on), among others.

The data processing system can update a data structure, including data corresponding to the interaction and the player (e.g., a member of the synchronized group) (STEP 308). In some implementations, the interaction received from at least one client device can be communicated to the data processing system. The data processing system can update one or more data structures of the contest based on received interaction data to reflect the latest activities/interactions within the synchronized group. The interaction data can range from contest entries and player decisions to more complex elements (e.g., real-time responses). In some implementations, the data processing system can maintain synchronization across multiple client devices, providing each client device in the synchronized group with immediate access to updated contest information (e.g., via various content items described herein). In some implementations, if a player profile opts out of the contest via their client device, the data processing system can process this withdrawal and request an update to update the participation list for the contest to remove the player profile.

In some implementations, the data processing system can receive information about permission settings from at least one client device associated with a player profile (e.g., a second player profile in this example) that performed an interaction. The interaction can include data related to the contest, such as entering the contest, placing a wager, responding to a contest event, or any other authorized activity within the synchronized group. The data processing system, upon receiving the data, can process the permission settings to confirm whether the second player profile has the authorization to perform actions within the synchronized group. In some implementations, the data processing system can analyze the received interaction data (e.g., associated with each player's actions, such as successful completions of tasks, participation in events, and wagering outcomes) to determine its impact on a player's score. In some implementations, based on the predefined scoring rules and/or the above analysis, the data processing system can update the individual scores for each player of a synchronized group. In some implementations, the score can be reflected in the data structure corresponding to the group feed to provide contest-related information or rankings within the synchronized group. In some implementations, scores can be updated based on wagering to determine scores within a contest, as described herein.

The data processing system can receive a request (e.g., a second request) to view the feed of the synchronized group (STEP 310). When a client device transmits a request to access a feed of the synchronized group, the data processing system can provide a dynamically updated feed of content items generated from the synchronized data structures and/or interactions corresponding to the synchronized group (STEP 312). As described herein, the feed can include one or more content items, each generated based on data corresponding to contest activities and interactions of player profiles within the synchronized group. Each content item can include information such as an identifier of the contest, an identifier of the player profile that requested the creation of the contest, and identifiers of player profiles that responded to the contest, for example, by placing a wager.

In some implementations, the content item can display information about the participating player profiles. In some implementations, the content item via the data processing system can provide attributes of a contest. For example, the content item can include a contest ID, which can be an identifier of a contest. Additionally, the content item can include, but is not limited to, creator ID, sport type, bet limits, odds limits, contest status, expiration time, and even information, among others. The creator ID can be the identifier of the player profile who created the contest. The sport type can specify a sport or event the contest is based on. The bet limits can identify minimum and maximum wager amounts allowed for the contest. The content item can include odds limits, specifying the minimum and maximum odds allowed for wagers. The contest status can inform players whether the contest is currently active, inactive, or expired. The expiration time can establish the deadline for wagers or participation, e.g., by adding a time dimension to the contest. Additionally, for enhanced context, event information can be included, providing details such as the date, time, and/or participants if the contest is associated with a specific event.

In some implementations, the data processing system can provide contest-related information via a dynamic feed, including responder IDs (identifying players actively engaged with contest), response actions (describing specific actions of each player such as wagering, challenges, or comments), and points (offering updates on individual standings and point totals).

In some implementations, the data processing system can generate one or more data packages that present a content item corresponding to the generated data record or contest within the feed of a synchronized group. In some implementations, the data package can include a subset of the data record parameters of the data record that are suitable for sharing in a social media platform. To generate the data package, information such as contest corresponding to an event or live event on which the wager was placed, the odds of the wager opportunity at the time the wager was placed, the time the wager was placed, an identifier of the player profile that placed the wager, and information relating to the wager opportunity and type of wager, among others, can be extracted from the generated data record and stored as part of the data package. In some implementations, preferences in the player profile can indicate which portions of generated data records can be used to generate the data package. In some implementations, these preferences can be changed on the basis of each synchronized group. The various preferences in the player profile that authorize the automatic generation of data packages for user-selected synchronized groups, and that authorize particular portions of data records to be included in data packages generated for particular synchronized groups, can be modified using the client devices.

Various operations described herein can be implemented on computer systems. FIG. 4 shows a simplified block diagram of a representative server system 400, client computer system 414, and network 426 usable to implement certain embodiments of the present disclosure. In various embodiments, server system 400 or similar systems can implement services or servers described herein or portions thereof. Client computer system 414 or similar systems can implement clients described herein. The system (e.g., the data processing system 105) and others described herein can be similar to the server system 400.

Server system 400 can have a modular design that incorporates a number of modules 402; while two modules 402 are shown, any number can be provided. Each module 402 can include processing unit(s) 404 and local storage 406.

Processing unit(s) 404 can include a single processor, which can have one or more cores, or multiple processors. In some embodiments, processing unit(s) 404 can include a general-purpose primary processor as well as one or more special-purpose co-processors such as graphics processors, digital signal processors, or the like. In some embodiments, some or all processing units 404 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 404 can execute instructions stored in local storage 406. Any type of processors in any combination can be included in processing unit(s) 404.

Local storage 406 can include volatile storage media (e.g., DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 406 can store one or more software programs to be executed by processing unit(s) 404, such as an operating system and/or programs implementing various server functions such as functions of the data processing system 105 of FIG. 1 or any other system described herein, or any other server(s) associated with the data processing system 105, or any other system described herein.

"Software" refers generally to sequences of instructions that, when executed by processing unit(s) 404 cause server system 400 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and the network 426, such as the Internet. Technologies can be used, including wired (e.g., Ethernet, IEEE 802.3 standards) and/or wireless technologies (e.g., Wi-Fi, IEEE 802.11 standards).

In some embodiments, local storage 406 is intended to provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. In some embodiments, additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Work allocation techniques can be used. As requests are processed, results can be returned to the requester via WAN interface 410. Such operation can generally be automated. Further, in some embodiments, WAN interface 410 can connect multiple server systems 400 to each other, providing scalable systems capable of managing high volumes of activity. Techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processing unit(s) 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to the network 426, such as a wide area network (e.g., the Internet) to which WAN interface 410 of server system 400 is also connected. In various embodiments, network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. In various embodiments, user input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 424 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with embodiments of the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the gaming system described herein can include clients and servers. For example, the gaming system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from their characteristics thereof. Although the examples provided may be useful for creating synchronized data structures for synchronized groups, the systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
   one or more processors coupled to memory, the one or more processors configured to:
   receive, from a first client device associated with a first player profile identified as a host of a synchronized group, a request to create a contest for the synchronized group, the request identifying an interaction type to be performed for participation in the contest;
   generate the contest within the synchronized group, the contest defining criteria for participation including at least the interaction type;
   receive an indication that a second player profile identified in the synchronized group performed an interaction having the interaction type;
   determine that the second player profile includes a permission setting authorizing performance of actions to be included in the synchronized group;
   update a data structure corresponding to a feed of the synchronized group to include data corresponding to the interaction and the second player profile responsive to determining that the second player profile includes the permission setting;
   receive, from the first client device, a second request to view the feed of the synchronized group; and
   provide, to the first client device, the feed of the synchronized group including a content item generated based on the data and comprising an identifier of the contest and the second player profile.

2. The system of claim 1, wherein the one or more processors are further configured to:
   receive, from a second client device associated with the second player profile, a third request to perform the interaction; and
   generate a data record corresponding to the interaction performed via the second player profile.

3. The system of claim 2, wherein the one or more processors are further configured to:
   update the data structure corresponding to the feed of the synchronized group based on the data record.

4. The system of claim 1, wherein the one or more processors are further configured to receive a fourth request to revoke the permission setting of the second player profile authorizing performance of actions to be included in the synchronized group.

5. The system of claim 1, wherein the request further identifies at least one criteria for the interaction for participation in the contest.

6. The system of claim 1, wherein the one or more processors are further configured to:
   determine that the interaction performed via the second player profile satisfies the criteria for the contest; and
   update the data structure corresponding to the feed of the synchronized group responsive to determining that the interaction satisfies the criteria.

7. The system of claim 1, wherein the one or more processors are further configured to:
   receive an expiration time for the contest; and
   update the synchronized group with an indication that the contest is expired responsive to determining that a current time exceeds the expiration time.

8. The system of claim 1, wherein the one or more processors are further configured to:
   determine a score for the second player profile based on an outcome corresponding to the interaction; and
   generate contest results for the contest of the synchronized group based on the score.

9. The system of claim 1, wherein the one or more processors are further configured to:
   restrict updates to the contest responsive to updating the contest based on a threshold number of interactions satisfying the criteria of the contest.

10. A method, comprising:
    receiving, by one or more processors coupled to memory, from a first client device associated with a first player profile identified as a host of a synchronized group, a request to create a contest for the synchronized group, the request identifying an interaction type to be performed for participation in the contest;
    generating, by the one or more processors, the contest within the synchronized group, the contest defining criteria for participation including at least the interaction type;
    receiving, by the one or more processors, an indication that a second player profile identified in the synchronized group performed an interaction having the interaction type;
    determining, by the one or more processors, that the second player profile includes a permission setting authorizing performance of actions to be included in the synchronized group;

updating, by the one or more processors, a data structure corresponding to a feed of the synchronized group to include data corresponding to the interaction and the second player profile responsive to determining that the second player profile includes the permission setting;

receiving, by the one or more processors, from the first client device, a second request to view the feed of the synchronized group; and providing, by the one or more processors, to the first client device, the feed of the synchronized group including a content item generated based on the data and comprising an identifier of the contest and the second player profile.

11. The method of claim 10, further comprising:
receiving, by the one or more processors, from a second client device associated with the second player profile, a third request to perform the interaction; and
generating, by the one or more processors, a data record corresponding to the interaction performed via the second player profile.

12. The method of claim 11, further comprising updating, by the one or more processors, the data structure corresponding to the feed of the synchronized group based on the data record.

13. The method of claim 10, further comprising receiving, by the one or more processors, a fourth request to revoke the permission setting of the second player profile authorizing performance of actions to be included in the synchronized group.

14. The method of claim 10, wherein the request further identifies at least one criteria for the interaction for participation in the contest.

15. The method of claim 10, further comprising:
determining, by the one or more processors, that the interaction performed via the second player profile satisfies the criteria for the contest; and
updating, by the one or more processors, the data structure corresponding to the feed of the synchronized group responsive to determining that the interaction satisfies the criteria.

16. The method of claim 10, further comprising:
receiving, by the one or more processors, an expiration time for the contest; and
updating, by the one or more processors, the synchronized group with an indication that the contest is expired responsive to determining that a current time exceeds the expiration time.

17. The method of claim 10, further comprising:
determining, by the one or more processors, a score for the second player profile based on an outcome corresponding to the interaction; and
generating, by the one or more processors, contest results for the contest of the synchronized group based on the score.

18. The method of claim 10, further comprising restricting, by the one or more processors, updates to the contest responsive to updating the contest based on a threshold number of interactions satisfying the criteria of the contest.

\* \* \* \* \*